United States Patent
Wang et al.

(10) Patent No.: US 11,736,224 B2
(45) Date of Patent: Aug. 22, 2023

(54) DATA TRANSMISSION METHOD AND ELECTRONIC DEVICE

(71) Applicants: Huawei Technologies Co., Ltd., Shenzhen (CN); Peking University, Beijing (CN)

(72) Inventors: Hao Wang, Shanghai (CN); Chenren Xu, Beijing (CN); Shuo Chen, Shenzhen (CN); Jianfeng Qi, Shenzhen (CN); Henghui Liang, Shenzhen (CN); Xiaojin Li, Shenzhen (CN); Lili Liu, Shenzhen (CN); Guan Wang, Shenzhen (CN)

(73) Assignees: Huawei Technologies Co., Ltd., Shenzhen (CN); Peking University, Beijing (CN)

( * ) Notice: Subject to any disclaimer, the term of this patent is extended or adjusted under 35 U.S.C. 154(b) by 120 days.

(21) Appl. No.: 17/421,283

(22) PCT Filed: Dec. 10, 2019

(86) PCT No.: PCT/CN2019/124347
§ 371 (c)(1),
(2) Date: Jul. 7, 2021

(87) PCT Pub. No.: WO2020/143380
PCT Pub. Date: Jul. 16, 2020

(65) Prior Publication Data
US 2022/0158756 A1 May 19, 2022

(30) Foreign Application Priority Data
Jan. 8, 2019 (CN) .......................... 201910016807.7

(51) Int. Cl.
*H04L 67/141* (2022.01)
*H04L 67/148* (2022.01)
(Continued)

(52) U.S. Cl.
CPC .......... *H04L 1/0018* (2013.01); *H04L 69/163* (2013.01); *H04W 76/15* (2018.02); *H04W 80/06* (2013.01); *H04W 84/12* (2013.01)

(58) Field of Classification Search
None
See application file for complete search history.

(56) References Cited

U.S. PATENT DOCUMENTS 10,602,560 B2 * 3/2020 Skog ...................... H04L 67/14
11,252,608 B2 * 2/2022 Hwang ................... H04L 45/24
(Continued)

FOREIGN PATENT DOCUMENTS

CN 103875304 A 6/2014
CN 105553868 A 5/2016
(Continued)

OTHER PUBLICATIONS

Bonaventure et al., "Use Cases and Operational Experience with Multipath TCP," Internet Engineering Task Force (IETF), Request for Comments: 8041, Total 30 pages (Jan. 2017).

(Continued)

*Primary Examiner* — Duc T Duong
(74) *Attorney, Agent, or Firm* — Leydig, Voit & Mayer, Ltd.

(57) ABSTRACT

This application provides a data transmission method. The method includes: An electronic device first establishes an MPTCP connection to an application server, where the MPTCP connection includes two TCP connections. Then, the electronic device receives indication information from an application server, where the indication information includes a type identifier and a parameter. When the type identifier indicates a low data transmission delay requirement, the electronic device receives, in a first time period after the electronic device receives the indication informa- (Continued)

tion, the data stream by using a first TCP connection. When an accumulated data amount actually received by the electronic device in the first time period is less than a product of the parameter and duration corresponding to the first time period, the electronic device receives the data stream in a second time period by using both the two TCP connections.

10 Claims, 14 Drawing Sheets

(51) Int. Cl.
*H04L 69/163* (2022.01)
*H04W 76/15* (2018.01)
*H04L 1/00* (2006.01)
*H04W 80/06* (2009.01)
*H04W 84/12* (2009.01)

(56) References Cited

U.S. PATENT DOCUMENTS

| | | | | |
|---|---|---|---|---|
| 2013/0232534 | A1* | 9/2013 | Salkintzis | H04W 76/16 725/116 |
| 2015/0245409 | A1* | 8/2015 | Medapalli | H04W 76/15 370/329 |
| 2016/0286251 | A1* | 9/2016 | Kopka | H04N 21/23406 |
| 2016/0373339 | A1* | 12/2016 | Teyeb | H04L 45/22 |
| 2017/0188407 | A1* | 6/2017 | Zee | H04L 12/4625 |
| 2017/0290036 | A1* | 10/2017 | Han | H04W 72/1215 |
| 2017/0339257 | A1* | 11/2017 | Kanagarathinam | H04L 45/124 |
| 2018/0062979 | A1* | 3/2018 | Zee | H04L 45/245 |
| 2018/0067436 | A1 | 3/2018 | Ueno | |
| 2018/0103123 | A1* | 4/2018 | Skog | H04L 69/14 |
| 2018/0234335 | A1* | 8/2018 | Sridhar | H04L 1/1607 |
| 2018/0254979 | A1* | 9/2018 | Scahill | H04L 45/70 |
| 2018/0309664 | A1* | 10/2018 | Balasubramanian | H04L 47/122 |
| 2019/0124547 | A1* | 4/2019 | Dasgupta | H04W 8/04 |
| 2019/0306068 | A1* | 10/2019 | Kiss | H04W 36/08 |
| 2020/0007905 | A1* | 1/2020 | Han | H04L 41/0803 |
| 2020/0053167 | A1* | 2/2020 | Yang | G06F 9/4875 |
| 2020/0228633 | A1* | 7/2020 | Yu | H04L 47/2441 |
| 2020/0259738 | A1* | 8/2020 | Wang | H04L 69/14 |
| 2020/0322841 | A1* | 10/2020 | Hyun | H04W 72/1226 |
| 2021/0058329 | A1* | 2/2021 | Perras | H04L 47/24 |
| 2021/0084523 | A1* | 3/2021 | Kucera | H04W 28/06 |
| 2022/0417151 | A1* | 12/2022 | Sze | H04L 43/0882 |

FOREIGN PATENT DOCUMENTS

| | | |
|---|---|---|
| CN | 108307689 A | 7/2018 |
| CN | 108337699 A | 7/2018 |
| CN | 108540519 A | 9/2018 |
| CN | 108696849 A | 10/2018 |
| CN | 109041262 A | 12/2018 |
| CN | 109076017 A | 12/2018 |
| EP | 3226604 A1 | 10/2017 |
| EP | 3244581 A1 | 11/2017 |
| EP | 3314864 A1 | 5/2018 |
| JP | 2017028589 A | 2/2017 |
| JP | 2017143336 A | 8/2017 |
| WO | 2016099371 A1 | 6/2016 |
| WO | 2016156425 A1 | 10/2016 |
| WO | 2016204639 A1 | 12/2016 |
| WO | 2018112657 A1 | 6/2018 |

OTHER PUBLICATIONS

"MultiPath TCP—Linux Kernel implementation," https://www.multipath-tcp.org/, Total 2 pages (retrieved Aug. 26, 2021).

* cited by examiner

DATA TRANSMISSION METHOD AND ELECTRONIC DEVICE

This application is a National Stage of International Application No. PCT/CN2019/124347, filed on Dec. 10, 2019, which claims priority to Chinese Patent Application No. 201910016807.7, filed on Jan. 8, 2019, both of which are hereby incorporated by reference in their entireties.

TECHNICAL FIELD

This application relates to the field of terminal technologies, and in particular, to a data transmission method and an electronic device.

BACKGROUND

A multipath transmission control protocol (MPTCP) is an extension of a transmission control protocol (TCP), and improves resource utilization and enhances a capability of connection failure recovery through parallel transmission performed by using a plurality of TCP connections. Currently, a widely used MPTCP scheduling algorithm is a minimum round-trip time scheduling algorithm, that is, a receive end preferentially uses a TCP connection with a minimum round-trip time to receive data. When a receive window of the TCP connection with the minimum round-trip time is congested, a TCP connection with a second minimum round-trip time is used to receive the data. However, actually, in most public places such as an airport, a shopping mall, a school, and a company, a round-trip time of a wireless fidelity (WIFI) network is far greater than a round-trip time of a cellular network in terms of an average value or a jitter. Therefore, the existing MPTCP scheduling algorithm consumes more data traffic of a user.

Therefore, the prior art proposes some MPTCP scheduling solutions for saving data traffic of a cellular network. For example, when an MPTCP includes both a TCP connection corresponding to a WIFI network and a TCP connection corresponding to a cellular network, a mobile phone usually preferentially uses only the TCP connection corresponding to the WIFI network to receive a data stream. When a data transmission rate of the TCP connection corresponding to the WIFI network does not meet a requirement, the mobile phone uses the TCP connection corresponding to the cellular network to receive the data stream. However, because a jitter of the WIFI network is far greater than that of the cellular network, the mobile phone usually cannot detect, in time, that the WIFI network has a weak signal or is limited, and therefore does not use, in time, the TCP connection corresponding to the cellular network to receive the data stream. Consequently, frame freezing occurs during video playing, and the video playing is not smooth, affecting user experience.

SUMMARY

This application provides a data transmission method and an electronic device, to resolve a problem of frame freezing caused by preferentially occupying a TCP connection corresponding to a WIFI network during existing data transmission.

According to a first aspect, an embodiment of this application provides a data transmission method. The method is applicable to an electronic device, and the method includes: The electronic device first establishes an MPTCP connection to an application server, where the MPTCP connection includes a first TCP connection corresponding to a cellular network and a second TCP connection corresponding to a WIFI network, and a data transmission delay of the first TCP connection is less than a data transmission delay of the second TCP connection. Then, the electronic device receives indication information from the application server, where the indication information includes a type identifier and a parameter used to indicate a bandwidth requirement, and the type identifier is used to indicate a type of a data stream sent by the application server. When the type identifier is a first identifier indicating a low data transmission delay requirement, the electronic device receives, after receiving the indication information, the data stream in a first time period by using the second TCP connection. When an accumulated data amount received by the electronic device in the first time period is less than a product of the parameter and duration corresponding to the first time period, the electronic device receives the data stream in a second time period by using both the first TCP connection and the second TCP connection.

In this embodiment of this application, the electronic device compares an accumulated data amount actually received in real time with an accumulated data amount expected to be received, to determine whether to enable a first TCP connection corresponding to an LTE network, and a determining result is also real-time and accurate. Therefore, frame freezing and unsmooth playing on a mobile phone can be alleviated to some extent.

In a possible design, when the accumulated data amount actually received by the electronic device in the first time period meets a first accumulated data amount expected to be received, the electronic device receives the data stream from the application server in the second time period still by using the second TCP connection.

In a possible design, when determining that an accumulated data amount received by the electronic device in the second time period by using the second TCP connection meets a second accumulated data amount expected to be received, the electronic device receives the data stream from the application server in a third time period by using only the second TCP connection, where the second accumulated data amount expected to be received is equal to a product of the parameter and duration corresponding to the second time period.

In this embodiment of this application, the electronic device receives the data stream in the third time period by using only the second TCP connection, and disables the first TCP connection corresponding to the cellular network. In this way, less data traffic of the cellular network can be consumed. In addition, because power consumption of the cellular network is greater than power consumption of the WIFI network, disabling the first TCP connection corresponding to the cellular network when the first TCP connection is not required can reduce power consumption to some extent.

In a possible design, when the type identifier is a second identifier indicating a high data transmission delay requirement, the electronic device receives, after receiving the indication information, the data stream from the application server in the first time period by using both the first TCP connection and the second TCP connection.

In this embodiment of this application, when the data stream has a relatively high delay requirement, the electronic device receives the data stream by using the two TCP connections in time, so that a data stream receiving rate can be increased to some extent, and a playing start delay can be reduced.

According to a second aspect, an embodiment of this application provides a data transmission method. The method is applicable to an electronic device, and the method includes:

The electronic device establishes an MPTCP connection to an application server, where the MPTCP connection includes a first TCP connection corresponding to a cellular network and a second TCP connection corresponding to a WIFI network. Then, the electronic device receives a data stream from the application server in a first time period by using the second TCP connection. The electronic device determines a first data transmission rate of the electronic device in the first time period based on a first accumulated data amount actually received by the electronic device in the first time period, where the first data transmission rate is equal to a ratio of the first accumulated data amount to duration corresponding to the first time period. When the first data transmission rate does not meet a preset data transmission rate, the electronic device receives the data stream from the application server in a second time period by using both the first TCP connection and the second TCP connection.

In this embodiment of this application, when the electronic device cannot determine content of the received data stream and a real-time data transmission rate requirement, the electronic device preferentially attempts to receive the data stream by using the second TCP connection corresponding to the WIFI network. If the data transmission rate does not meet the preset requirement, the electronic device receives the data stream by using the two TCP connections in time.

In a possible design, the electronic device receives the data stream from the application server by using both the first TCP connection and the second TCP connection. Then, the electronic device determines the preset data transmission rate based on accumulated data amounts actually received by using the second TCP connection and the first TCP connection per unit of time.

In a possible design, the electronic device determines a second data transmission rate of the electronic device in a second time period based on a second accumulated data amount actually received by the electronic device in the second time period, where the second data transmission rate is equal to a ratio of the second accumulated data amount to duration corresponding to the second time period. When determining that the second data transmission rate in the second time period meets the preset data transmission rate, the electronic device receives the data stream from the application server in a third time period by using only the second TCP connection.

In this embodiment of this application, less data traffic of the cellular network can be consumed. In addition, because power consumption of the cellular network is greater than power consumption of the WIFI network, disabling the first TCP connection corresponding to the cellular network when the first TCP connection is not required can reduce power consumption to some extent.

According to a third aspect, an embodiment of this application provides an electronic device, including a processor and a memory. The memory is configured to store one or more computer programs. When the one or more computer programs stored in the memory are executed by the processor, the electronic device is enabled to implement the method in any possible design of either of the foregoing aspects.

According to a fourth aspect, an embodiment of this application further provides an apparatus. The apparatus includes modules/units for performing the method in any possible design of either of the foregoing aspects. These modules/units may be implemented by hardware, or may be implemented by hardware by executing corresponding software.

According to a fifth aspect, an embodiment of this application further provides a computer-readable storage medium. The computer-readable storage medium includes a computer program, and when the computer program is run on an electronic device, the electronic device is enabled to perform the method in any possible design of either of the foregoing aspects.

According to a sixth aspect, an embodiment of this application provides a computer program product. When the computer program product is run on a terminal, the electronic device is enabled to perform the method in any possible design of ether of the foregoing aspects.

These aspects or other aspects of this application are clearer and more comprehensible in descriptions of the following embodiments.

BRIEF DESCRIPTION OF DRAWINGS

FIG. 9a and FIG. 9b-1 and FIG. 9b-2 are a third schematic diagram of a data transmission method according to an embodiment of this application;

DESCRIPTION OF EMBODIMENTS

The following describes the technical solutions in embodiments of this application with reference to accompanying drawings in the embodiments of this application. The terms "first" and "second" in descriptions of the embodiments of this application are merely used for a purpose of description, and shall not be understood as an indication or implication of relative importance or an implicit indication of a quantity of indicated technical features. Therefore, a feature limited by "first" or "second" may explicitly or implicitly include one or more features. In the descriptions of the embodiments of this application, unless otherwise stated, "a plurality of" means two or more.

Figure 1:
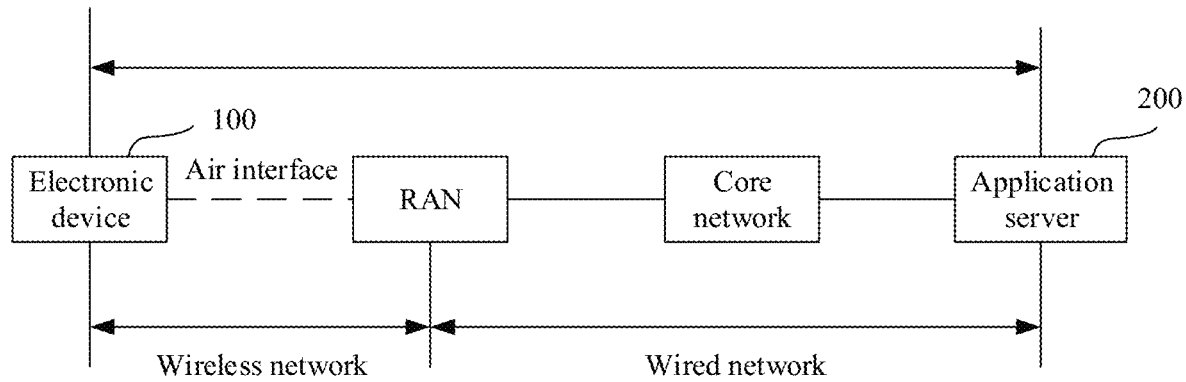
FIG. 1 is a system architecture to which a multipath data transmission method is applied according to an embodiment of this application.

A data transmission method provided in the embodiments of this application may be applied to data transmission in a wireless communications system. A data receive end and a data transmit end exchange data over a radio access network (RAN) and a core network. A transmission control protocol (TCP) connection may be further established between the data receive end and the data transmit end, and the TCP protocol is used for data transmission. As shown in FIG. 1, in a wireless communications system, an electronic device 100 exchanges data with an application server 200. The electronic device 100 accesses a RAN through an air interface, and is connected to the application server over a core network. A network between the electronic device 100 and the RAN may be referred to as a wireless network, and a network between the RAN and the application server 200 may be a wired network. A TCP connection is established between the application server 200 and the electronic device 100, and is used for data transmission.

There may be one or more application servers 200 in a server cluster. For example, different video segments of a video application are distributed on different servers, and there may be a plurality of application servers 200. For another example, videos of a video application are distributed on one server, and there may be one application server 200.

As communications technologies develop, a communications system has evolved to a communications architecture in which a plurality of communications networks are deployed together. A terminal may access at least one communications network for communication. It should be noted that, when the communications network is a local area network, the communications network may be, for example, a short-distance communications network such as a wireless fidelity (WIFI) network, a Bluetooth network, a ZigBee network, or a near field communication (NFC) network. When the communications network is a wide area network, the communications network may be, for example, a third-generation mobile communication technology (3G) network, a fourth-generation mobile communication technology (4G) network, a fifth-generation mobile communication technology (5G) network, a future evolved public land mobile network (PLMN), or the internet.

Figure 2:
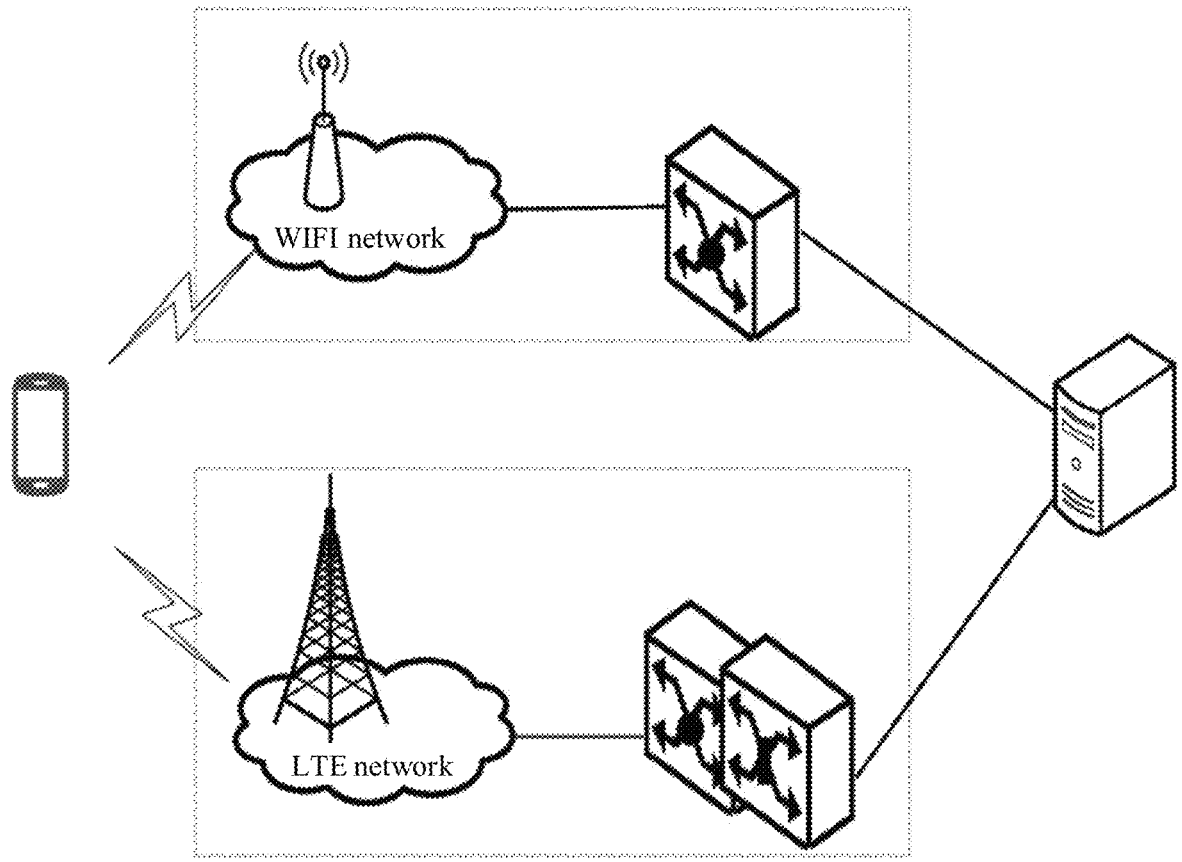
FIG. 2 is an architectural diagram of a data transmission system in which a plurality of networks are deployed according to an embodiment of this application.

For example, in a communications system in which a WIFI network and a long term evolution (LTE) network are deployed in FIG. 2, a terminal may access the WIFI network and transmit data to an application server by using an evolved packet data gateway (ePDG) or a trusted gateway (TGW), or may access the LTE network and transmit data to an application server by using a serving gateway (SGW) or a packet data network gateway (PGW).

Figure 3:
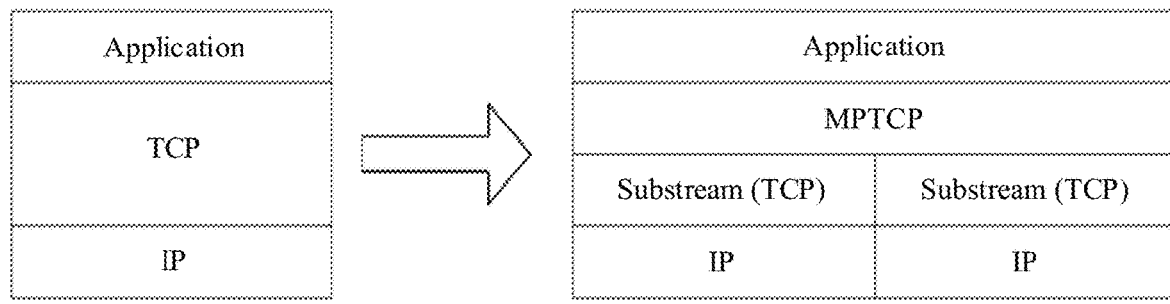
FIG. 3 is a schematic diagram of extending a TCP protocol stack to an MPTCP protocol stack according to an embodiment of this application.

Deployment of a heterogeneous network promotes development of a multipath data transmission service. Currently, an MPTCP protocol is obtained by extending a TCP protocol, and the MPTCP protocol is used to enable a service to use a multipath network resource to perform data transmission. For example, in FIG. 2, a mobile phone transmits data to the application server by using a WIFI network resource and an LTE network resource. FIG. 3 is a schematic diagram of extending a TCP protocol stack to an MPTCP protocol stack. In the TCP protocol stack, a data stream at an application layer is sent by using one TCP connection. In the MPTCP protocol stack, a transport layer is divided into two sublayers: an MPTCP layer and a TCP layer, and a data stream at an application layer is sent by using two TCP connections obtained through decomposition of the MPTCP layer.

Figure 4:
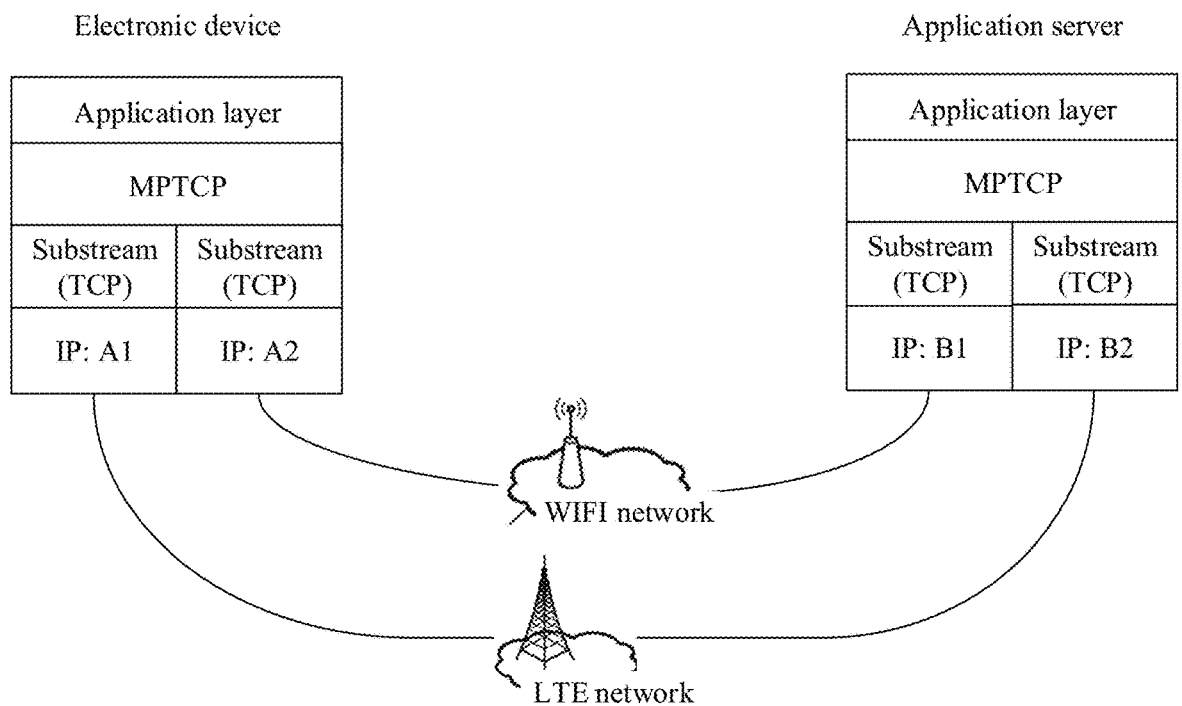
FIG. 4 is a schematic diagram of an MPTCP implementation process according to an embodiment of this application.

FIG. 4 is a schematic diagram of an application scenario of an MPTCP. In FIG. 4, two TCP connections are established between an electronic device and an application server. One TCP connection uses a WIFI network resource, and the other TCP connection uses an LTE network resource. An MPTCP layer of the application server decomposes a TCP stream into two TCP substreams, and then separately sends the two TCP substreams to the electronic device by using the two TCP connections. After receiving the two TCP substreams, the electronic device combines the two substreams and then sends a combined stream to an application layer.

In some embodiments of this application, the electronic device in the wireless communications system shown in FIG. 1 may be a portable terminal device that further includes another function such as a personal digital assistant function and/or a music player function, for example, a mobile phone, a tablet computer, or a wearable electronic device (for example, a smartwatch) with a wireless communication function. An example embodiment of the portable terminal device includes but is not limited to a portable terminal device using iOS®, Android®, Microsoft®, or another operating system. Alternatively, the portable terminal device may be another portable terminal device, for example, a laptop computer with a touch-sensitive surface (for example, a touch panel). It should be further understood that, in some other embodiments of this application, the electronic device may alternatively not be a portable electronic device, but a desktop computer with a touch-sensitive surface (for example, a touch panel).

Figure 5:
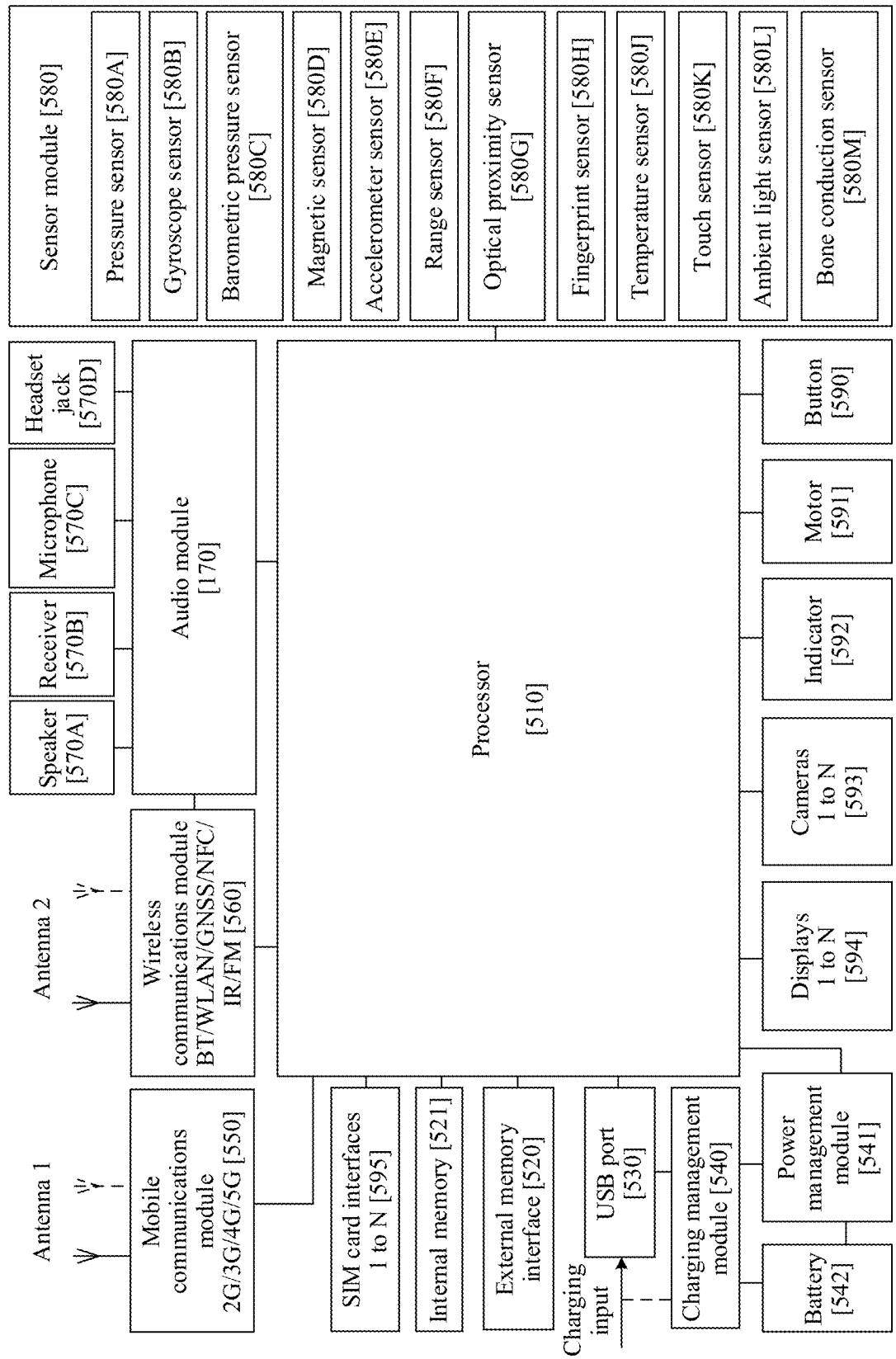
FIG. 5 is a schematic structural diagram of an electronic device according to an embodiment of this application.

For example, as shown in FIG. 5, the terminal device in the embodiments of this application may be a mobile phone. The following specifically describes the embodiments by using the mobile phone as an example.

The mobile phone may include a processor 510, an external memory interface 520, an internal memory 521, a USB port 530, a charging management module 540, a power management module 541, a battery 542, an antenna 1, an antenna 2, a mobile communications module 550, a wireless communications module 560, an audio module 570, a speaker 570A, a receiver 570B, a microphone 570C, a headset jack 570D, a sensor module 580, a button 590, a motor 591, an indicator 592, a camera 593, a display 594, a SIM card interface 595, and the like. The sensor module 580 may include a pressure sensor 580A, a gyroscope sensor 580B, a barometric pressure sensor 580C, a magnetic sensor 580D, an acceleration sensor 580E, a range sensor 580F, an optical proximity sensor 580G, a fingerprint sensor 580H, a temperature sensor 580J, a touch sensor 580K, an ambient light sensor 580L, a bone conduction sensor 580M, and the like.

It can be understood that a structure shown in the embodiments of the present disclosure does not constitute a specific limitation on the mobile phone. In some other embodiments of this application, the mobile phone may include more or fewer components than those shown in the figure, or some components may be combined, or some components may be split, or different component arrangements may be used. The components shown in the figure may be implemented by hardware, software, or a combination of software and hardware.

The processor 510 may include one or more processing units. For example, the processor 510 may include an application processor (AP), a modem processor, a graphics processing unit (GPU), an image signal processor (ISP), a controller, a memory, a video codec, a digital signal processor (DSP), a baseband processor, and/or a neural processing unit (NPU). Different processing units may be independent devices, or may be integrated into one or more processors.

The controller may be a nerve center and a command center of the mobile phone. The controller may generate an operation control signal based on an instruction operation code and a time sequence signal, to complete control of instruction fetching and instruction execution.

A memory may be further disposed in the processor 510, and is configured to store instructions and data. In some embodiments, the memory in the processor 510 is a cache memory. The memory may store instructions or data that is just used or cyclically used by the processor 510. If the processor 510 needs to use the instructions or the data again, the processor 510 may directly invoke the instructions or the data from the memory, to avoid repeated access and reduce a waiting time of the processor 510, thereby improving system efficiency.

In some embodiments, the processor 510 may include one or more interfaces. The interface may include an inter-integrated circuit (I2C) interface, an inter-integrated circuit sound (I2S) interface, a pulse code modulation (pulse code modulation, PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 510 may include a plurality of groups of I2C buses. The processor 510 may be separately coupled to the touch sensor 580K, a charger, a flash light, the camera 593, and the like through different I2C bus interfaces. For example, the processor 510 may be coupled to the touch sensor 580K through the I2C interface, so that the processor 510 communicates with the touch sensor 580K through the I2C bus interface, to implement a touch function of the mobile phone.

The I2S interface may be configured to perform audio communication. In some embodiments, the processor 510 may include a plurality of groups of I2S buses. The processor 510 may be coupled to the audio module 570 through the I2S bus, to implement communication between the processor 510 and the audio module 570. In some embodiments, the audio module 570 may transfer an audio signal to the wireless communications module 560 through the I2S interface, to implement a function of answering a call through a Bluetooth headset.

The PCM interface may also be configured to perform audio communication; and sample, quantize, and encode an analog signal. In some embodiments, the audio module 570 may be coupled to the wireless communications module 560 through the PCM bus interface. In some embodiments, the audio module 570 may alternatively transfer an audio signal to the wireless communications module 560 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect to the processor 510 and the wireless communications module 560. For example, the processor 510 communicates with a Bluetooth module in the wireless communications module 560 through the UART interface, to implement a Bluetooth function. In some embodiments, the audio module 170 may transfer an audio signal to the wireless communications module 560 through the UART interface, to implement a function of playing music through a Bluetooth headset.

The MIPI interface may be configured to connect to the processor 510 and a peripheral device such as the display 594 or the camera 593. The MIPI interface includes a camera serial interface (CSI), a display serial interface (DSI), and the like. In some embodiments, the processor 510 communicates with the camera 593 through the CSI interface, to implement a photographing function of the mobile phone. The processor 510 communicates with the display 594 through the DSI interface, to implement a display function of the mobile phone.

The GPIO interface may be configured by using software. The GPIO interface may be configured as a control signal, or may be configured as a data signal. In some embodiments, the GPIO interface may be configured to connect to the processor 510, the camera 593, the display 594, the wireless communications module 560, the audio module 570, the sensor module 580, and the like. The GPIO interface may alternatively be configured as the I2C interface, the I2S interface, the UART interface, the MIPI interface, or the like.

The USB port 530 is a port that conforms to a USB standard specification, and may be specifically a mini USB port, a micro USB port, a USB Type C port, or the like. The USB port 130 may be configured to connect to the charger to charge the mobile phone, or may be configured to transmit data between the mobile phone and a peripheral device, or may be configured to connect to a headset to play audio through the headset, or may be configured to connect to another terminal device such as an AR device.

It can be understood that an interface connection relationship between the modules shown in the embodiments of the present disclosure is merely an example for description, and does not constitute a limitation on the structure of the mobile phone. In some other embodiments of this application, the mobile phone may alternatively use an interface connection manner that is different from that in the foregoing embodiment, or a combination of a plurality of interface connection manners.

The charging management module 540 is configured to receive a charging input from the charger. The charger may be a wireless charger or a wired charger. In some embodiments of wired charging, the charging management module 540 may receive a charging input of a wired charger through the USB port. In some embodiments of wireless charging, the charging management module 540 may receive a wireless charging input through a wireless charging coil of the mobile phone. The charging management module 540 may further supply power to the electronic device through the power management module 541 while charging the battery 542.

The power management module 541 is configured to connect to the battery 542, the charging management module 540, and the processor 510. The power management module 541 receives an input of the battery 542 and/or the charging management module 540, and supplies power to the processor 510, the internal memory 521, an external memory, the display 594, the camera 593, the wireless communications module 560, and the like. The power management module 541 may be further configured to monitor parameters such as a battery capacity, a battery cycle count, and a battery health status (electric leakage or impedance). In some other embodiments, the power management module 541 may alternatively be disposed in the processor 510. In some other embodiments, the power management module 541 and the charging management module 540 may alternatively be disposed in a same device.

A wireless communication function of the mobile phone may be implemented through the antenna module 1, the antenna module 2, the mobile communications module 550, the wireless communications module 560, the modem processor, the baseband processor, and the like.

The antenna 1 and the antenna 2 are configured to transmit and receive an electromagnetic wave signal. Each antenna in the mobile phone may be configured to cover one or more communication bands. Different antennas may be further multiplexed, to increase antenna utilization. For example, an antenna of a cellular network may be multiplexed as a diversity antenna of a wireless local area network. In some other embodiments, the antenna may be used in combination with a tuning switch.

The mobile communications module 550 can provide a solution, applied to the mobile phone, to wireless communication including 2G/3G/4G/5G, and the like. The mobile communications module 550 may include at least one filter, a switch, a power amplifier, a low noise amplifier (LNA), and the like. The mobile communications module 550 may receive an electromagnetic wave through the antenna 1, perform processing such as filtering or amplification on the received electromagnetic wave, and transfer the electromagnetic wave to the modem processor for demodulation. The mobile communications module 550 may further amplify a signal modulated by the modem processor, and convert an amplified signal into an electromagnetic wave through the antenna 1 for radiation. In some embodiments, at least some function modules in the mobile communications module 550 may be disposed in the processor 510. In some embodiments, at least some function modules in the mobile communications module 550 may be disposed in a same device as at least some modules in the processor 510.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 570A, the receiver 570B, or the like), or displays an image or a video through the display 594. In some embodiments, the modem processor may be an independent device. In some other embodiments, the modem processor may be independent of the processor 510, and is disposed in a same device as the mobile communications module 550 or another function module.

The wireless communications module 560 may provide a solution, applied to the mobile phone, to wireless communication including a wireless local area network (WLAN), Bluetooth (BT), a global navigational satellite system (GNSS), frequency modulation (FM), near field communication (NFC), an infrared (IR) technology, and the like. The wireless communications module 560 may be one or more devices integrating at least one communication processing module. The wireless communications module 560 receives an electromagnetic wave through the antenna 2, performs frequency modulation and filtering processing on an electromagnetic wave signal, and sends a processed signal to the processor 510. The wireless communications module 560 may further receive a to-be-sent signal from the processor 510, perform frequency modulation and amplification on the signal, and convert a processed signal into an electromagnetic wave through the antenna 2 for radiation.

In some embodiments, in the mobile phone, the antenna 1 is coupled to the mobile communications module 550, and the antenna 2 is coupled to the wireless communications module 560, so that the mobile phone can communicate with a network and another device by using a wireless communications technology. The wireless communications technology may include a global system for mobile communications (GSM), a general packet radio service (GPRS), code division multiple access (CDMA), wideband code division multiple access (WCDMA), time division-code division multiple access (TD-SCDMA), long term evolution (LTE), BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The mobile phone implements the display function through the GPU, the display 594, the application processor, and the like. The GPU is a microprocessor for image processing, and is connected to the display 594 and the application processor. The GPU is configured to perform mathematical and geometric calculation, and perform graphics rendering. The processor 510 may include one or more GPUs, which execute a program instruction to generate or change display information.

The display 594 is configured to display an image, a video, and the like. The display 594 includes a display panel. The display panel may be a liquid crystal display (LCD), an organic light-emitting diode (OLED), an active-matrix organic light emitting diode (AMOLED), a flexible light-emitting diode (FLED), mini-LED, a micro-LED, a micro-OLED, a quantum dot light emitting diode (QLED), or the like. In some embodiments, the mobile phone may include one or N displays, where N is a positive integer greater than 1.

The mobile phone may implement the photographing function through the ISP, the camera 193, the video codec, the GPU, the display 594, the application processor, and the like.

The ISP is configured to process data fed back by the camera 593. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 593.

The camera 593 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the mobile phone may include one or N cameras, where N is a positive integer greater than 1.

The digital signal processor is configured to process a digital signal. In addition to the digital image signal, the digital signal processor may further process another digital signal. For example, when the mobile phone selects a frequency, the digital signal processor is configured to perform Fourier transform on frequency energy, and the like.

The video codec is configured to compress or decompress a digital video. The mobile phone may support one or more codecs. Therefore, the mobile phone may play or record videos in a plurality of encoding formats, for example, MPEG1, MPEG2, MPEG3, and MPEG4.

The NPU is a neural-network (NN) computing processor. The NPU quickly processes input information by referring to a biological neural network structure, for example, by referring to a mode of transfer between human brain neurons, and may further continuously perform self-learning. Intelligent cognition of the mobile phone such as image recognition, facial recognition, speech recognition, and text understanding can be implemented by using the NPU.

The external memory interface 520 may be configured to connect to an external memory card such as a micro SD card, to extend a storage capability of the mobile phone. The external memory card communicates with the processor 510 through the external memory interface 520, to implement a data storage function, for example, to store files such as music and a video in the external memory card.

The internal memory 521 may be configured to store computer-executable program code. The executable program code includes instructions. The processor 510 runs the instructions stored in the internal memory 521, to implement various function applications and data processing of the mobile phone. The memory 521 may include a program storage area and a data storage area. The program storage area may store an operating system, an application required by at least one function (for example, a sound playing function and an image playing function), and the like. The data storage area may store data (such as audio data and a phone book) created when the mobile phone is used, and the like. In addition, the memory 521 may include a high-speed random access memory, or may include a nonvolatile memory, for example, at least one magnetic disk storage device, a flash memory, or a universal flash storage (UFS).

The mobile phone may implement audio functions such as music playing and recording functions through the audio module 570, the speaker 570A, the receiver 570B, the microphone 570C, the headset jack 570D, the application processor, and the like.

The audio module 570 is configured to convert digital audio information into an analog audio signal for output, and is also configured to convert an analog audio input into a digital audio signal. The audio module 570 may be further configured to perform audio signal encoding and decoding. In some embodiments, the audio module 570 may be disposed in the processor 510, or some function modules in the audio module 570 are disposed in the processor 510.

The speaker 570A, also referred to as a "horn", is configured to convert an audio electrical signal into a sound signal. The mobile phone may listen to music or answer a hands-free call through the speaker 570A.

The receiver 570B, also referred to as an "earpiece", is configured to convert an audio electrical signal into a sound signal. When the mobile phone answers a call or receives a voice message, the receiver 170B may be put close to a human ear to listen to the voice message.

The microphone 570C, also referred to as a "mike" or a "microphone", is configured to convert a sound signal into an electrical signal. When making a call or sending a voice message, a user may make a sound near the microphone 570C through the mouth of the user, to enter a sound signal to the microphone 570C. At least one microphone 570C may be disposed in the mobile phone. In some other embodiments, two microphones may be disposed in the mobile phone, to collect a sound signal and further implement a noise reduction function. In some other embodiments, three, four, or more microphones may alternatively be disposed in the mobile phone, to collect a sound signal, reduce noise, identify a sound source, implement a directional recording function, and the like.

The headset jack 570D is configured to connect to a wired headset. The headset jack may be the USB port, or may be a 3.5 mm open mobile electronic device platform (OMTP) standard interface or a cellular telecommunications industry association of the USA (CTIA) standard interface.

The pressure sensor 580A is configured to sense a pressure signal, and can convert the pressure signal into an electrical signal. In some embodiments, the pressure sensor 580A may be disposed in the display 594. There are many types of pressure sensors 580A, for example, a resistive pressure sensor, an inductive pressure sensor, and a capacitive pressure sensor. The capacitive pressure sensor may include at least two parallel plates made of conductive materials. A capacitance between electrodes changes when force is applied to the pressure sensor 580A. The mobile phone determines a pressure strength based on a capacitance change. When a touch operation is performed on the display 594, the mobile phone detects a strength of the touch operation based on the pressure sensor 580A. The mobile phone may also calculate a touch position based on a detection signal of the pressure sensor 580A. In some embodiments, touch operations that are performed on a same touch position but have different touch operation strengths may correspond to different operation instructions. For example, when a touch operation whose touch operation strength is less than a first pressure threshold is performed on an icon of Messages, an instruction for viewing an SMS message is executed; or when a touch operation whose touch operation strength is greater than or equal to a first pressure threshold is performed on an icon of Messages, an instruction for creating a new SMS message is executed.

The gyroscope sensor 580B may be configured to determine a motion posture of the mobile phone. In some embodiments, an angular velocity of the mobile phone around three axes (that is, axes x, y, and z) may be determined through the gyroscope sensor 580B. The gyroscope sensor 580B may be used for image stabilization during photographing. For example, when the shutter is pressed, the gyroscope sensor 580B detects an angle at which the mobile phone jitters, calculates, based on the angle, a distance for which a lens module needs to compensate, and allows the lens to eliminate the jitter of the mobile phone through a reverse motion, to implement image stabilization. The gyroscope sensor 580B may be further used in a navigation scenario and a somatic game scenario.

The barometric pressure sensor 580C is configured to measure barometric pressure. In some embodiments, the mobile phone calculates an altitude by using an atmospheric pressure value obtained by the barometric pressure sensor 580C through measurement, to assist in positioning and navigation.

The magnetic sensor 580D includes a Hall sensor. The mobile phone may detect opening and closing of a flip cover through the magnetic sensor 580D. In some embodiments, when the mobile phone is a clamshell phone, the mobile phone may detect opening and closing of a flip cover based on the magnetic sensor 580D, to set a feature such as automatic unlocking through flipping based on a detected opening or closing state of the flip cover.

The acceleration sensor 580E may detect acceleration values in various directions (usually on three axes) of the mobile phone, and may detect a gravity value and a gravity direction when the mobile phone is still. The acceleration sensor 580E may be further configured to identify a posture of the electronic device, and is applied to applications such as a pedometer and switching between a landscape mode and a portrait mode.

The range sensor 580F is configured to measure a distance. The mobile phone may measure a distance in an infrared or a laser manner. In some embodiments, in a photographing scenario, the mobile phone may measure a distance through the range sensor 180F, to implement quick focusing.

The optical proximity sensor 580G may include, for example, a light-emitting diode (LED) and an optical detector such as a photodiode. The light-emitting diode may be an infrared light-emitting diode. The mobile phone emits infrared light by using the light-emitting diode. The mobile phone detects infrared reflected light from a nearby object through the photodiode. When sufficient reflected light is detected, it may be determined that there is an object near the mobile phone. When insufficient reflected light is detected, the mobile phone may determine that there is no object near the mobile phone. The mobile phone may detect, through the optical proximity sensor 580G, that the user holds the mobile phone close to the ear for a call, to automatically perform screen-off for power saving. The optical proximity sensor 580G may also be used in a smart cover mode or a pocket mode to automatically perform screen unlocking or locking.

The ambient light sensor 580L is configured to sense ambient light luminance. The mobile phone may adaptively adjust luminance of the display 594 based on the sensed ambient light luminance. The ambient light sensor 180L may be further configured to automatically adjust a white balance during photographing. The ambient light sensor 580L may further cooperate with the optical proximity sensor 580G to detect whether the mobile phone is in a pocket, to prevent an accidental touch.

The fingerprint sensor 580H is configured to collect a fingerprint. The mobile phone may implement fingerprint-based unlocking, application lock access, fingerprint-based photographing, fingerprint-based call answering, and the like by using a feature of the collected fingerprint.

The temperature sensor 580J is configured to detect a temperature. In some embodiments, the mobile phone executes a temperature processing policy by using the temperature detected by the temperature sensor 580J. For example, when the temperature reported by the temperature sensor 580J exceeds a threshold, the mobile phone degrades performance of the processor nearby the temperature sensor 580J, to reduce power consumption for thermal protection. In some other embodiments, when the temperature is less than another threshold, the mobile phone heats the battery 542, to prevent the mobile phone from being abnormally powered off because of a low temperature. In some other embodiments, when the temperature is less than still another threshold, the mobile phone boosts an output voltage of the battery 542, to prevent abnormal power-off caused by a low temperature.

The touch sensor 580K is also referred to as a "touch panel". The touch sensor 580K may be disposed in the display 594. The touch sensor 580K is configured to detect a touch operation performed on or near the touch sensor 580K. The touch sensor 580K may transfer the detected touch operation to the application processor, to determine a type of a touch event, and to provide a visual output related to the touch operation through the display 594. In some other embodiments, the touch sensor 580K may alternatively be disposed on a surface of the mobile phone at a position different from that of the display 594.

The bone conduction sensor 580M may obtain a vibration signal. In some embodiments, the bone conduction sensor 580M may obtain a vibration signal of a vibration bone of a human vocal-cord part. The bone conduction sensor 580M may also contact a body pulse to receive a blood pressure beating signal. In some embodiments, the bone conduction sensor 580M may alternatively be disposed in a headset. The audio module 570 may obtain a voice signal through parsing based on the vibration signal that is of the vibration bone of the vocal-cord part and that is obtained by the bone conduction sensor 580M, to implement a voice function. The application processor may parse heart rate information based on the blood pressure beating signal obtained by the bone conduction sensor 580M, to implement a heart rate detection function.

The button 590 includes a power button, a volume button, and the like. The button may be a mechanical button, or may be a touch button. The mobile phone may receive a button input, and generate a button signal input related to a user setting and function control of the mobile phone.

The motor 591 may generate a vibration prompt. The motor 591 may be used for an incoming call vibration prompt, or may be used for a touch vibration feedback. For example, touch operations performed on different applications (for example, photographing and audio playing) may also correspond to different vibration feedback effects. Touch operations performed on different areas on the display 594 may correspond to different vibration feedback effects of the motor 591. Different application scenarios (for example, a time reminder scenario, an information receiving scenario, an alarm clock scenario, and a game scenario) may also correspond to different vibration feedback effects. A touch vibration feedback effect may alternatively be customized.

The indicator 592 may be an indicator light, which may be configured to indicate a charging status and a power change, or may be configured to indicate a message, a missed call, a notification, and the like.

The SIM card interface 595 is configured to connect to a subscriber identity module (SIM) card. The SIM card may be inserted into the SIM card interface or removed from the SIM card interface, to implement contact with or separation from the mobile phone. The mobile phone may support one or N SIM card interfaces, where N is a positive integer greater than 1. The SIM card interface 595 may support a nano-SIM card, a micro-SIM card, a SIM card, and the like.

A plurality of cards may be simultaneously inserted into one SIM card interface. The plurality of cards may be of a same type or different types. The SIM card interface 595 may also be compatible with different types of SIM cards. The SIM card interface 595 may also be compatible with an external memory card. The mobile phone interacts with a network by using the SIM card, to implement functions such as calling and data communication. In some embodiments, the mobile phone uses an eSIM, that is, an embedded SIM card. The eSIM card may be embedded in the mobile phone, and cannot be separated from the mobile phone. A software system of the mobile phone may use a layered architecture, an event-driven architecture, a microkernel architecture, a micro service architecture, or a cloud architecture. In the embodiments of the present disclosure, an Android system with a layered architecture is used as an example to describe a software structure of the mobile phone.

Figure 6:
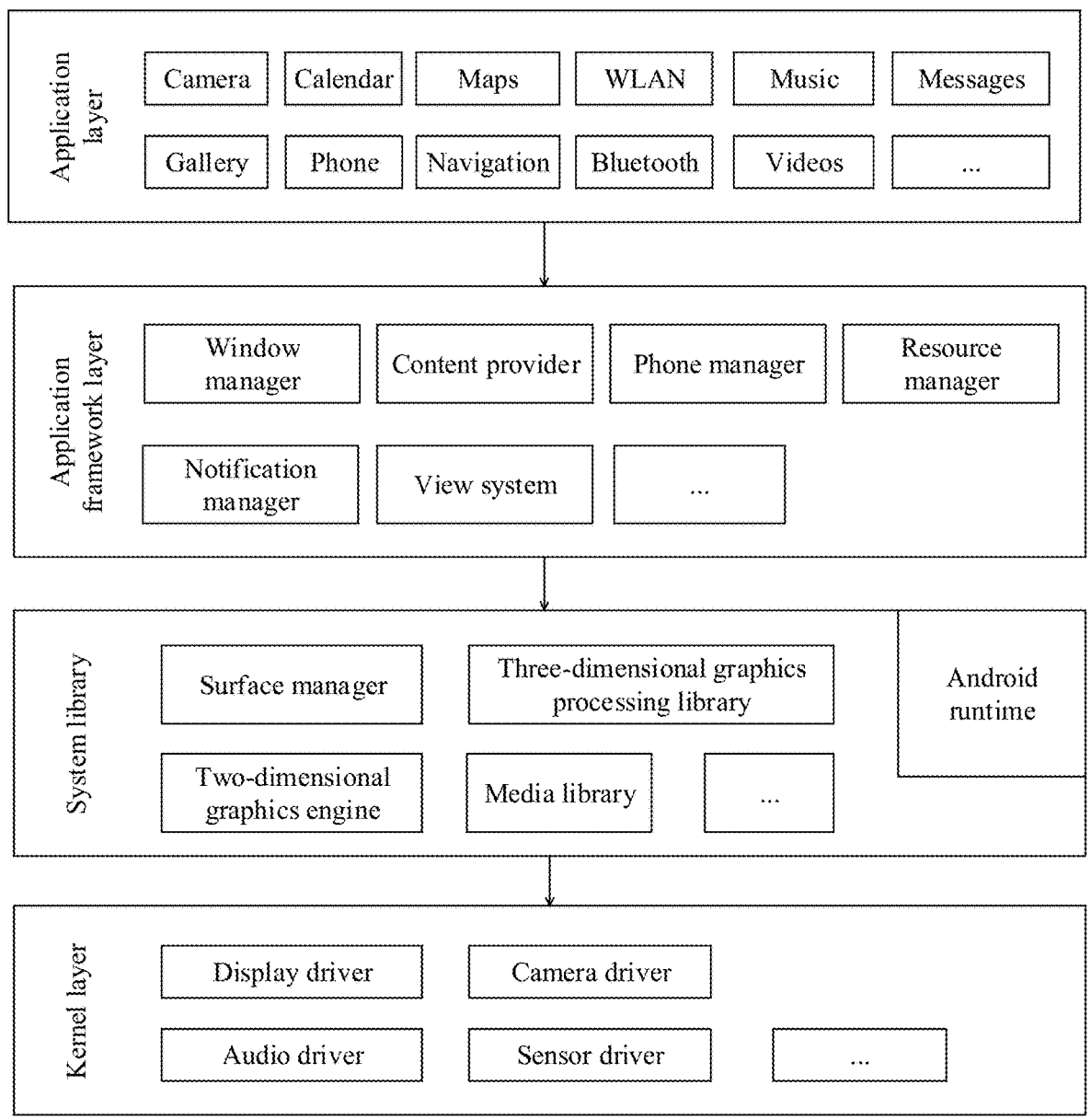
FIG. 6 is a schematic architectural diagram of an Android system according to an embodiment of this application.

FIG. 6 is a block diagram of the software structure of the mobile phone in the embodiments of the present disclosure.

In the layered architecture, software is divided into several layers, and each layer has a clear role and task. The layers communicate with each other through software interfaces. In some embodiments, the Android system is divided into four layers: an application layer, an application framework layer, an Android runtime and system library, and a kernel layer from top to bottom.

The application layer may include a series of application packages.

As shown in FIG. 6, the application packages may include applications such as Camera, Gallery, Calendar, Phone, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 6, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system can be configured to construct an application. A display interface may include one or more views. For example, a display interface including a notification icon of Messages may include a text display view and an image display view.

The phone manager is configured to provide a communication function of the mobile phone, for example, management of a call status (including answering, declining, or the like).

The resource manager provides various resources for an application, for example, a localized string, an icon, an image, a layout file, and a video file.

The notification manager enables an application to display notification information in a status bar, and may be configured to convey a notification message. The notification manager may automatically disappear after a short pause without requiring user interaction. For example, the notification manager is configured to: notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog box. For example, text information is prompted in the status bar, an alert sound is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 7A:
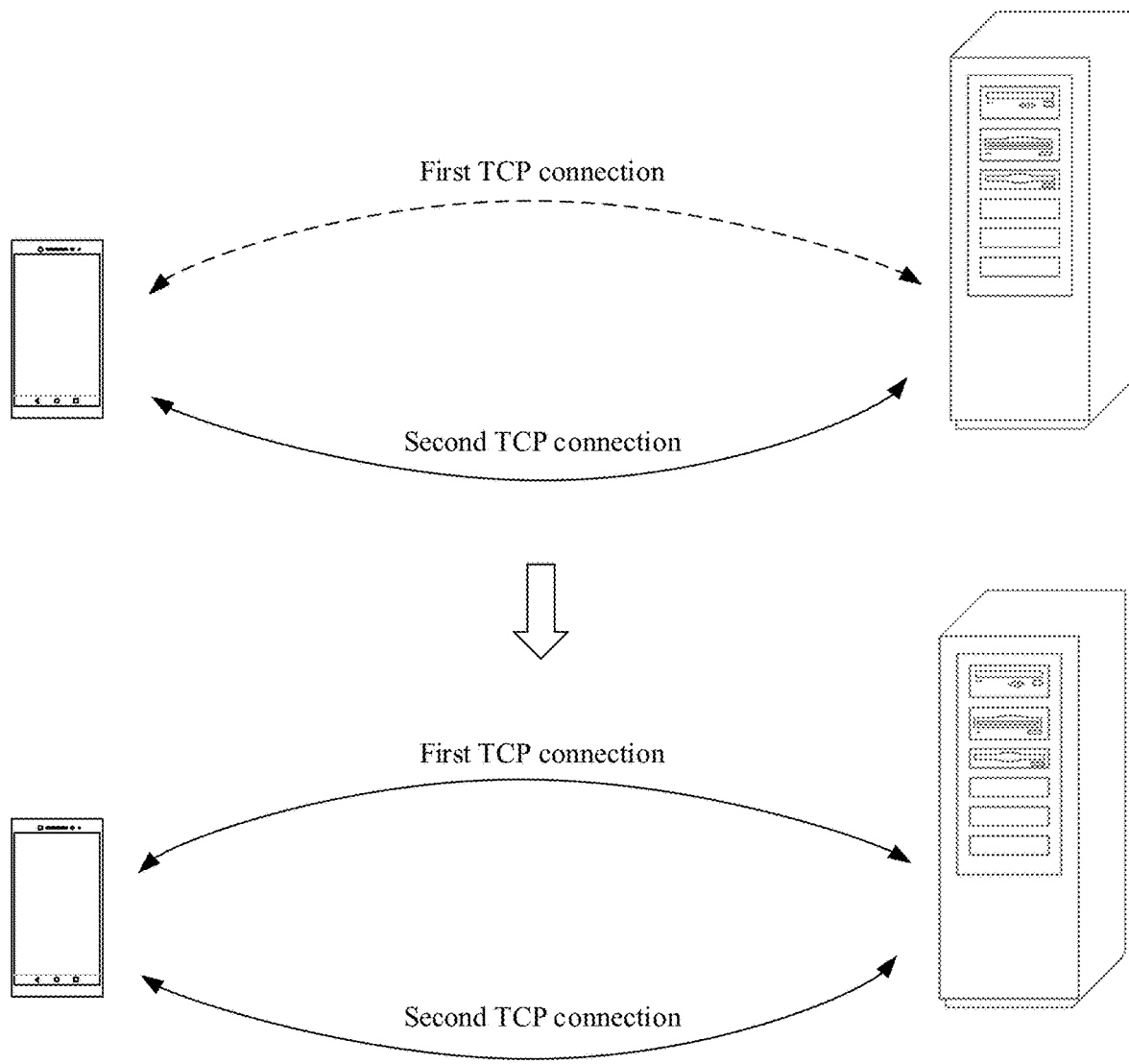
FIG. 7a is a first schematic diagram of a data transmission method according to an embodiment of this application.

As shown in FIG. 7*a*, it is assumed that an MPTCP connection has been established between a mobile phone and an application server, and the MPTCP connection includes a first TCP connection corresponding to an LTE network and a second TCP connection corresponding to a WIFI network. Currently, when the mobile phone uses the MPTCP connection, if the mobile phone receives a first identifier from the application server, where the first identifier indicates that a data stream has a low data transmission delay requirement, the mobile phone preferentially uses the second TCP connection corresponding to the WIFI network shown in FIG. 7*a* to receive the data stream. When a data transmission rate (the data transmission rate is a data amount received per unit of time) of the second TCP connection corresponding to the WIFI network is insufficient (for example, lower than 2 Mbps), the mobile phone further enables the first TCP connection corresponding to the cellular network to receive the data. However, because a jitter of the WIFI network is relatively large, a scenario in which the WIFI network is not smooth may often occur, as shown in Table 1. Consequently, frame freezing and unsmooth playing may occur.

TABLE 1

| Scenario | Reason |
| --- | --- |
| A speed of the WIFI network is limited. | For example, a roommate is downloading a file, or hotel WIFI or shopping mall WIFI is shared by many people. |
| A router is fully loaded, a channel is fully occupied, or router performance is excessively poor. | For example, dozens of people in an office use one router. |
| A signal is weak. | For example, a house is excessively large. |

For example, when the mobile phone is used to watch a movie in the network speed-limited scenario shown in Table 1, a video download rate (that is, a data transmission rate) of the mobile phone may be about 1 mbps. If the current movie is a high-definition video, a video download rate requirement is 4 mbps, frame freezing and unsmooth playing occur when the mobile phone is playing the movie. If the mobile phone determines, by monitoring the data transmission rate of the second TCP connection, whether to enable the TCP connection corresponding to the cellular network, at least an average value of data transmission rates in two to three time periods (for example, duration corresponding to one time period is 3 s, and duration corresponding to two time periods is 6 s) needs to be calculated to determine whether the current data transmission rate meets a bandwidth requirement. In this case, when the mobile phone determines that the TCP connection corresponding to the WIFI is not smooth, frame freezing usually occurs on the mobile phone for 2 s to 3 s, or even longer.

Therefore, an embodiment of this application provides a data transmission method. For example, in the method, a mobile phone periodically collects statistics about whether an accumulated data amount actually received in each time period (for example, duration corresponding to each time period is 3 s) by using a second TCP connection is greater than an accumulated data amount expected to be received. For example, a bandwidth requirement is 4 mbps, and the accumulated data amount expected to be received is a product of 4 mbps and 3 s, that is, 12 mb. Assuming that the mobile phone is still used to watch a movie in the network speed-limited scenario shown in Table 1, and a video download rate of the mobile phone by using the second TCP connection is only about 1 mbps, an accumulated data amount received by the mobile phone in this time period may be definitely only 3 mb, which is far less than 12 mb. Therefore, the mobile phone immediately enables a TCP connection corresponding to an LTE network. After the mobile phone enables the first TCP connection corresponding to the LTE network, because a video download rate of the first TCP connection corresponding to the LTE network is very high, for example, 5 mbps, an accumulated data amount received by the mobile phone by using the first TCP connection corresponding to the WIFI network and the LTE network in a next time period (it is assumed that duration corresponding to this time period is still 3 s) is about 18 mb, which meets the accumulated data amount expected to be received (3 mb+4 mbps×3 s=17 mb). It can be learned that, because an accumulated data amount actually received by the mobile phone by using each TCP connection may be obtained in real time through an interface, the mobile phone compares an actually received accumulated data amount with an accumulated data amount expected to be received, to determine whether to enable the first TCP connection corresponding to the LTE network, and a determining result is also real-time and accurate. Therefore, frame freezing and unsmooth playing on the mobile phone can be alleviated to some extent.

Figure 7B:
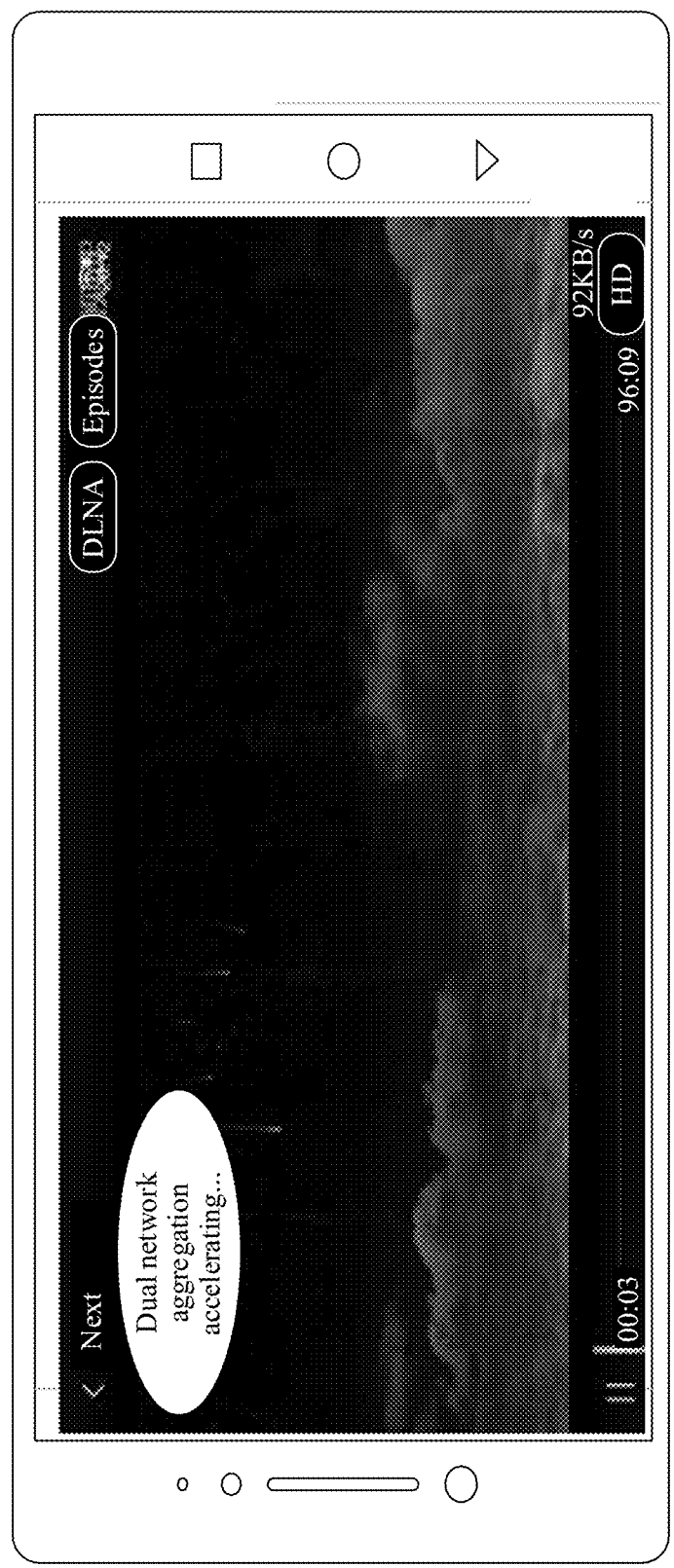
FIG. 7b and FIG. 7c are schematic diagrams of application scenarios of a data transmission method according to embodiments of this application.
Figure 7C:
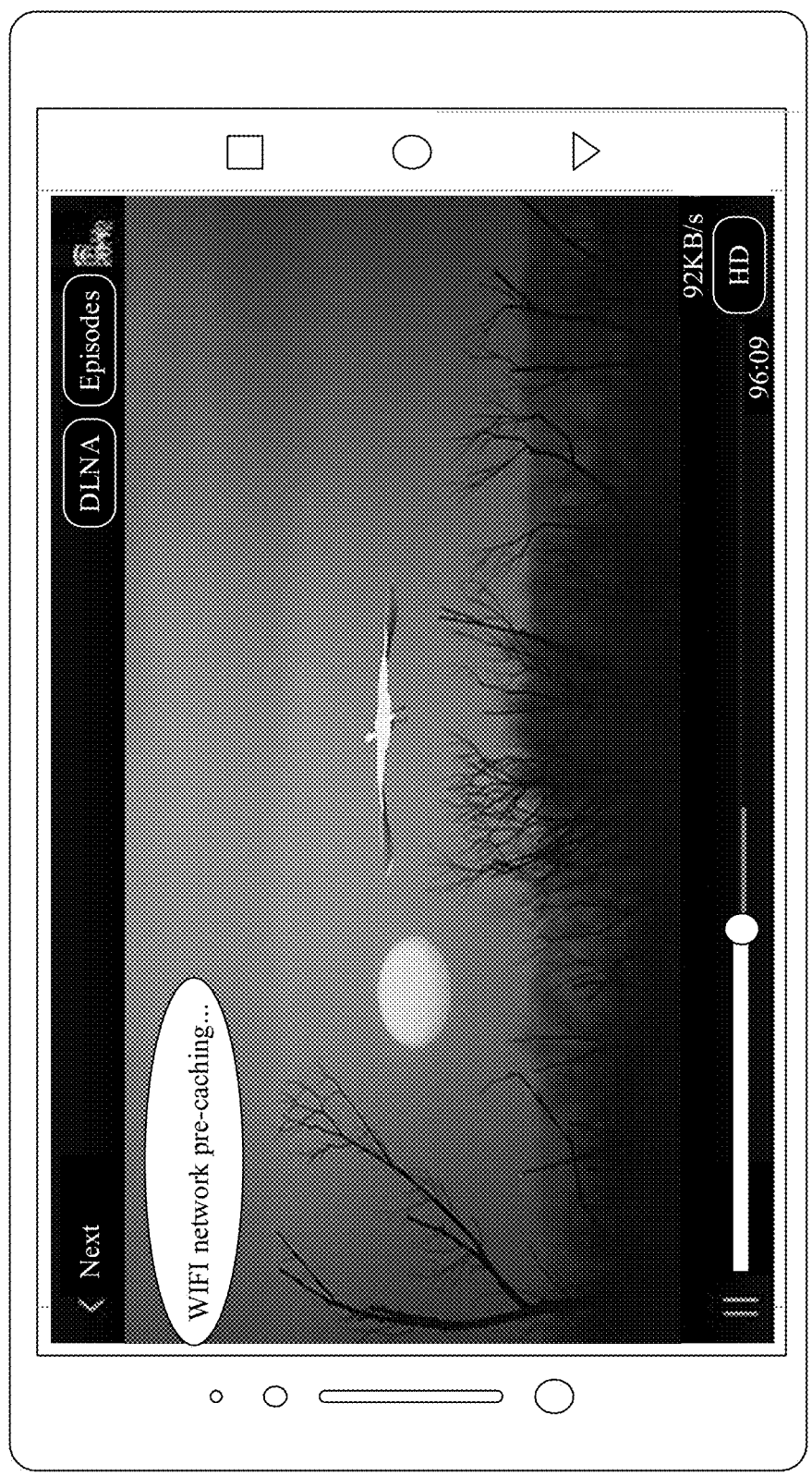

In this embodiment of this application, the foregoing data stream transmission method is further described by using an example with reference to scenarios shown in FIG. 7b and FIG. 7c.

Scenario 1: When the mobile phone receives an operation (for example, a tap operation) performed by a user 1 on a play control of a play interface of a video application, the mobile phone sends, to an application server corresponding to the video application, a message for requesting to obtain a multimedia file "Next". After receiving the message, the application server sends a data stream of the multimedia file to the mobile phone by using an MPTCP protocol. The mobile phone receives the data stream according to the foregoing data stream transmission method, and displays an interface shown in FIG. 7b.

Specifically, because the application server corresponding to the video application first sends indication information before sending each data stream, after receiving the indication information from the application server, the mobile phone obtains, from the indication information, a second identifier and a parameter used to indicate a bandwidth requirement, and the mobile phone uses the first TCP connection corresponding to the cellular network to receive the data stream. If a bandwidth requirement of the data stream is still not met when a receive window of the TCP connection corresponding to the cellular network is adjusted to a maximum value, the mobile phone may further use the TCP connection corresponding to the WIFI network to receive the data stream. In this way, after detecting the operation performed by the user 1, the mobile phone can quickly start to play the first frame of the multimedia file "Next", that is, a playing start delay is relatively short, thereby improving user experience.

Scenario 2: As shown in FIG. 7c, in a process in which the mobile phone plays the multimedia file "Next", the mobile phone further receives a data stream of a cache period from the application server. Before sending the data stream of the cache period, the application server first sends indication information corresponding to a type identifier of the data stream of the cache period to the mobile phone. After receiving the indication information from the application server, the mobile phone obtains, from the indication information, a first identifier and a parameter used to indicate a bandwidth requirement. The mobile phone preferentially uses the second TCP connection corresponding to the WIFI network to receive the data stream in a first time period. The mobile phone obtains a first accumulated data amount actually received in the first time period. If the first accumulated data amount is less than a first accumulated data amount expected to be received (this may be because of a weak WIFI signal), where the first accumulated data amount expected to be received is a product of the parameter used to indicate the bandwidth requirement and duration corresponding to the first time period, the mobile phone may further use the TCP connection corresponding to the LTE network to receive the data stream.

Figure 8:
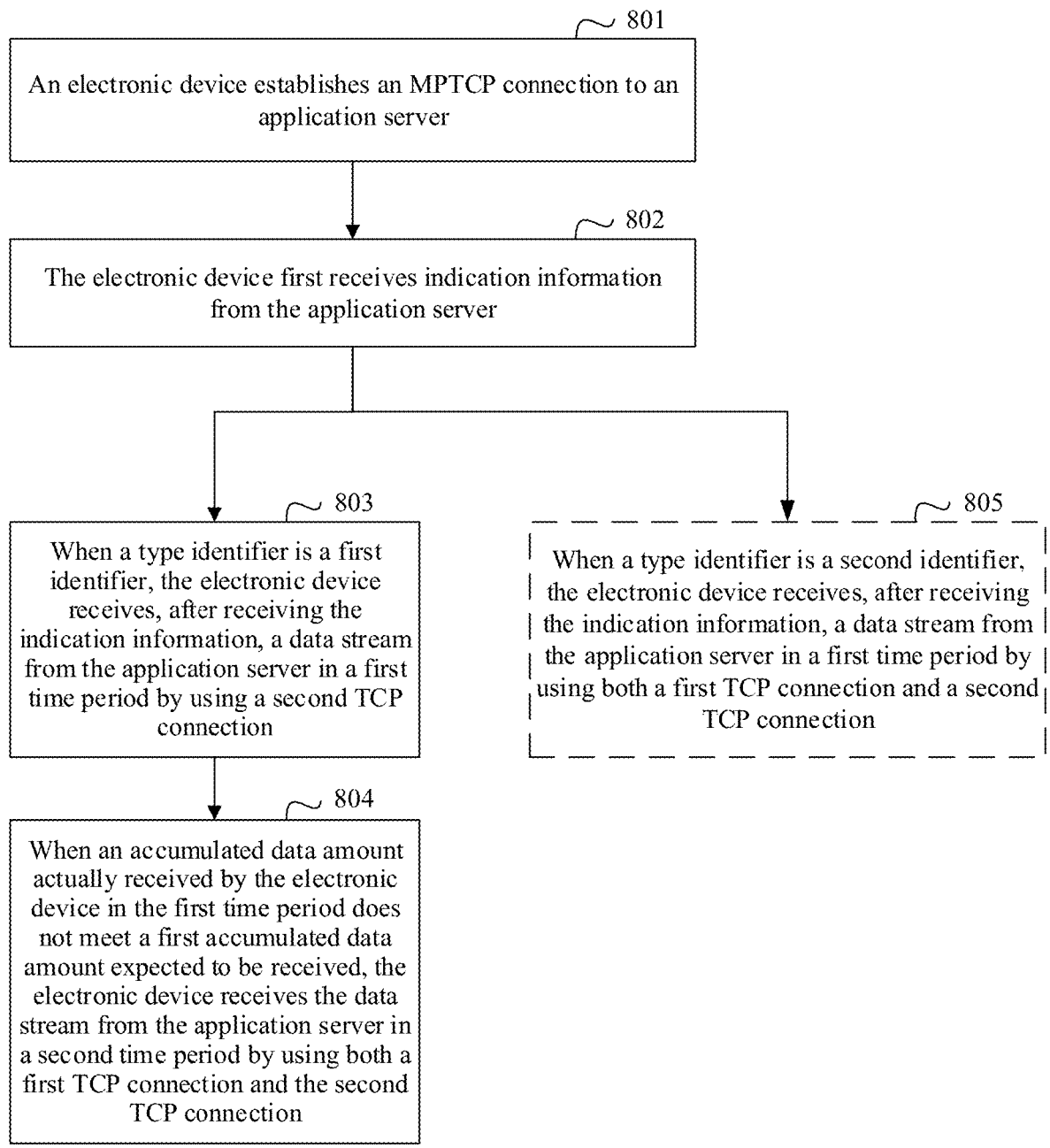
FIG. 8 is a second schematic diagram of a data transmission method according to an embodiment of this application.

FIG. 8 shows an example of a procedure of a data transmission method according to an embodiment of this application. The method is applicable to a scenario in which a data stream sent by an application server carries indication information. The method is performed by an electronic device, and the method includes the following steps.

Step 801: The electronic device establishes an MPTCP connection to the application server.

The MPTCP connection includes a first TCP connection corresponding to a cellular network and a second TCP connection corresponding to a WIFI network, and a data transmission delay of the first TCP connection is less than a data transmission delay of the second TCP connection.

Step 802: The electronic device receives the indication information from the application server.

The indication information includes a type identifier and a parameter used to indicate a data transmission rate requirement, and the type identifier is mainly used to indicate a type of the data stream sent by the application server. For example, as shown in Table 2, if the data stream sent by the application server has a relatively low data transmission delay requirement, the type identifier is a first identifier. For example, the first identifier is a character string "background". If the data stream sent by the application server has a relatively high data transmission delay requirement, the type identifier is a second identifier. For example, the second identifier is a character string "interactive".

TABLE 2

| First identifier | Character string "background" |
|---|---|
| Second identifier | Character string "interactive" |

It should be noted that the indication information sent by the application server is related to the data stream sent by the application server subsequently, and there is a time sequence between the indication information sent by the application server and the data stream sent by the application server subsequently. For example, if the type identifier included in the indication information sent by the application server is the first identifier, the data stream sent by the application server subsequently is a data stream related to the first identifier.

Step 803: When the type identifier is the first identifier, the electronic device receives, after receiving the indication information, the data stream from the application server in a first time period by using the second TCP connection.

That is, when determining that the data stream sent by the application server does not have a high data transmission delay requirement, the electronic device receives the data stream by using only the second TCP connection corresponding to the WIFI network. In this way, less data traffic of the cellular network can be consumed to some extent.

Step 804: When an accumulated data amount actually received by the electronic device in the first time period does not meet a first accumulated data amount expected to be received, the electronic device receives the data stream from the application server in a second time period by using both the first TCP connection and the second TCP connection.

Figure 9A:
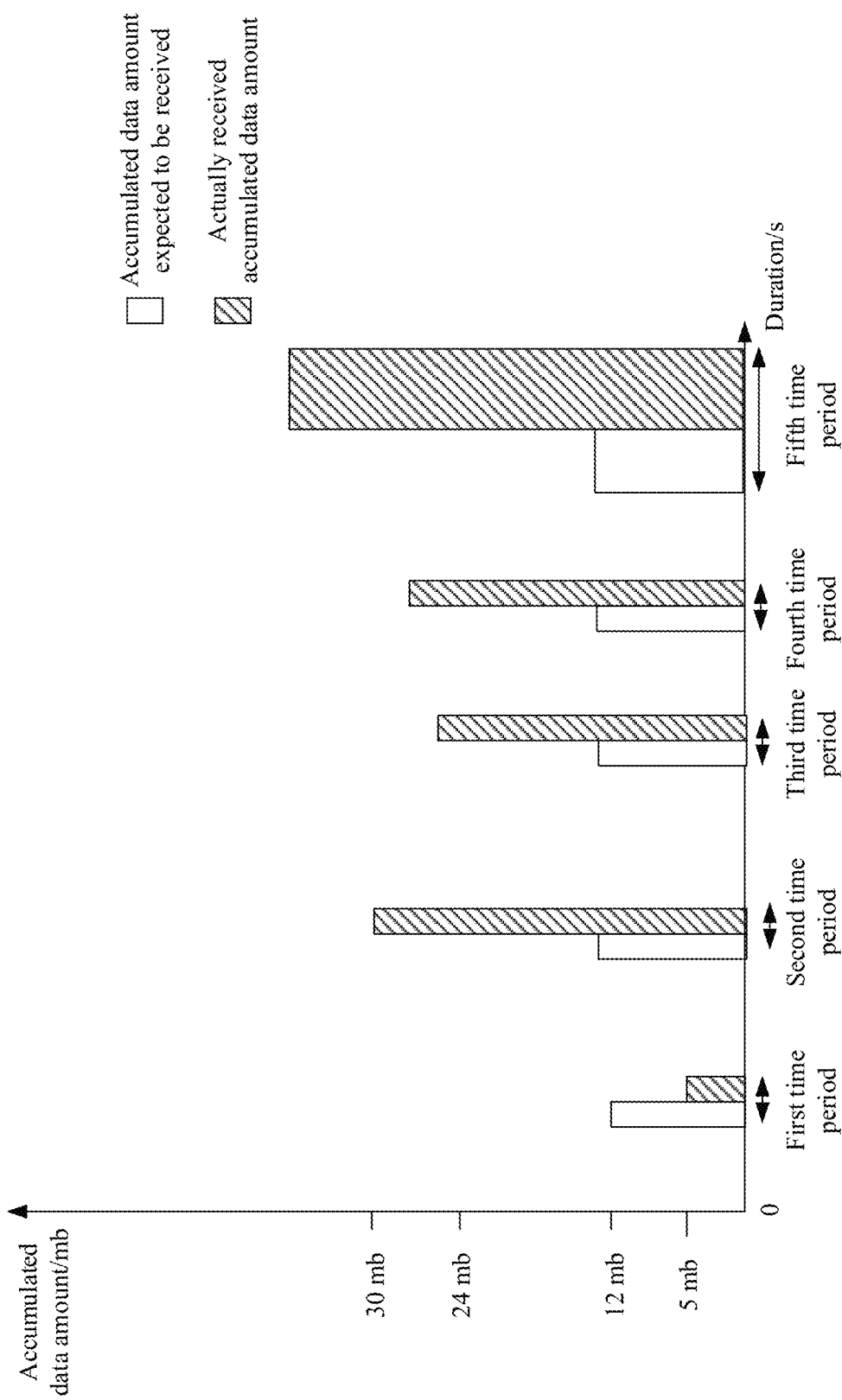

The first accumulated data amount expected to be received is equal to a product of a parameter used to indicate a bandwidth requirement and duration corresponding to the first time period. For example, if the duration corresponding to the first time period is 3 seconds, and the parameter used to indicate the bandwidth requirement in the indication information sent by the application server is 4 mbps, the accumulated data amount expected to be received is 12 mb. That is, in this step, when the electronic device is in any scenario shown in Table 1, the electronic device determines that an accumulated data amount actually received by the electronic device by using only the second TCP connection corresponding to the WIFI network is far less than the first accumulated data amount expected to be received. Therefore, the electronic device further uses the TCP connection corresponding to the cellular network immediately. As shown in FIG. 9a, the accumulated data amount actually received in the first time period is 5 mb, and the first accumulated data amount expected to be received is 12 mb. Because the actually received accumulated data amount is less than the first accumulated data amount expected to be received, the electronic device receives the data stream from the application server in the second time period by using both the first TCP connection and the second TCP connection. It should be noted that, for ease of comparison, monitoring periods occupied by two rectangular graphs shown in FIG. 9a are different. However, in FIG. 9a, a monitoring period and monitoring duration occupied by a column graph indicating an accumulated data amount expected to be received on a horizontal axis are the same as those occupied by a rectangular graph indicating an actually received accumulated data amount on the horizontal axis.

Step 805: Optionally, when the type identifier is the second identifier, the electronic device receives, after receiving the indication information, the data stream from the application server in the first time period by using both the first TCP connection and the second TCP connection.

That is, when determining that the data stream sent by the application server has a high data transmission delay requirement, the electronic device receives the data stream by using both the second TCP connection corresponding to the WIFI network and the first TCP connection corresponding to the cellular network. In this way, a data stream receiving rate can be increased to some extent, and a playing start delay can be reduced.

In a possible design, when determining that the first accumulated data amount actually received by the electronic device in the first time period by using the second TCP connection meets the first accumulated data amount expected to be received, the electronic device receives the data stream from the application server in the second time period still by using the second TCP connection.

In a possible design, if the electronic device receives the data stream from the application server in the second time period by using both the first TCP connection and the second TCP connection, when determining that an accumulated data amount actually received by the electronic device in the second time period by using the second TCP connection meets a second accumulated data amount expected to be received, the electronic device receives the data stream from the application server in a third time period by using only the second TCP connection. The second accumulated data amount expected to be received is equal to a product of duration corresponding to the second time period and a parameter used to indicate a bandwidth requirement.

For example, as shown in FIG. 9a, if the duration corresponding to the second time period is 3 seconds, and the parameter used to indicate the bandwidth requirement in the indication information sent by the application server is 4 mbps, the second accumulated data amount expected to be received is a product of 3 seconds and 4 mbps, that is, 12 mb. If the WIFI network changes from a rate-limited state to a rate-unlimited state, a data transmission rate of the WIFI network also increases. It is assumed that the application server learns, through statistics collection in the second time period, that the actually received accumulated data amount is 30 mb. It can be learned that the accumulated data amount actually received by the electronic device by using the second TCP connection meets the second accumulated data amount expected to be received. Therefore, the electronic device receives the data stream in the third time period by using only the second TCP connection, and the first TCP connection corresponding to the cellular network is disabled. In this way, less data traffic of the cellular network can be consumed. In addition, because power consumption of the cellular network is greater than power consumption of the WIFI network, disabling the first TCP connection corresponding to the cellular network when the first TCP connection is not required can reduce power consumption to some extent.

In addition, if the electronic device detects that accumulated data amounts actually received by the electronic device in a plurality of subsequent consecutive time periods by using the second TCP connection are all less than or greater than an accumulated data amount expected to be received, the electronic device may prolong monitoring duration corresponding to the subsequent time periods. As shown in FIG. 9a, for example, if data amounts actually received by the electronic device in the third time period and a fourth time period by using the second TCP connection are both greater than a data amount expected to be received, the electronic device adjusts monitoring duration corresponding to a fifth time period from 3 s to 30s. In this way, because a quantity of times of determining whether an accumulated data amount received by using the second TCP connection meets an accumulated data amount expected to be received is reduced, power consumption can be reduced to some extent.

Figures 1, 9B:
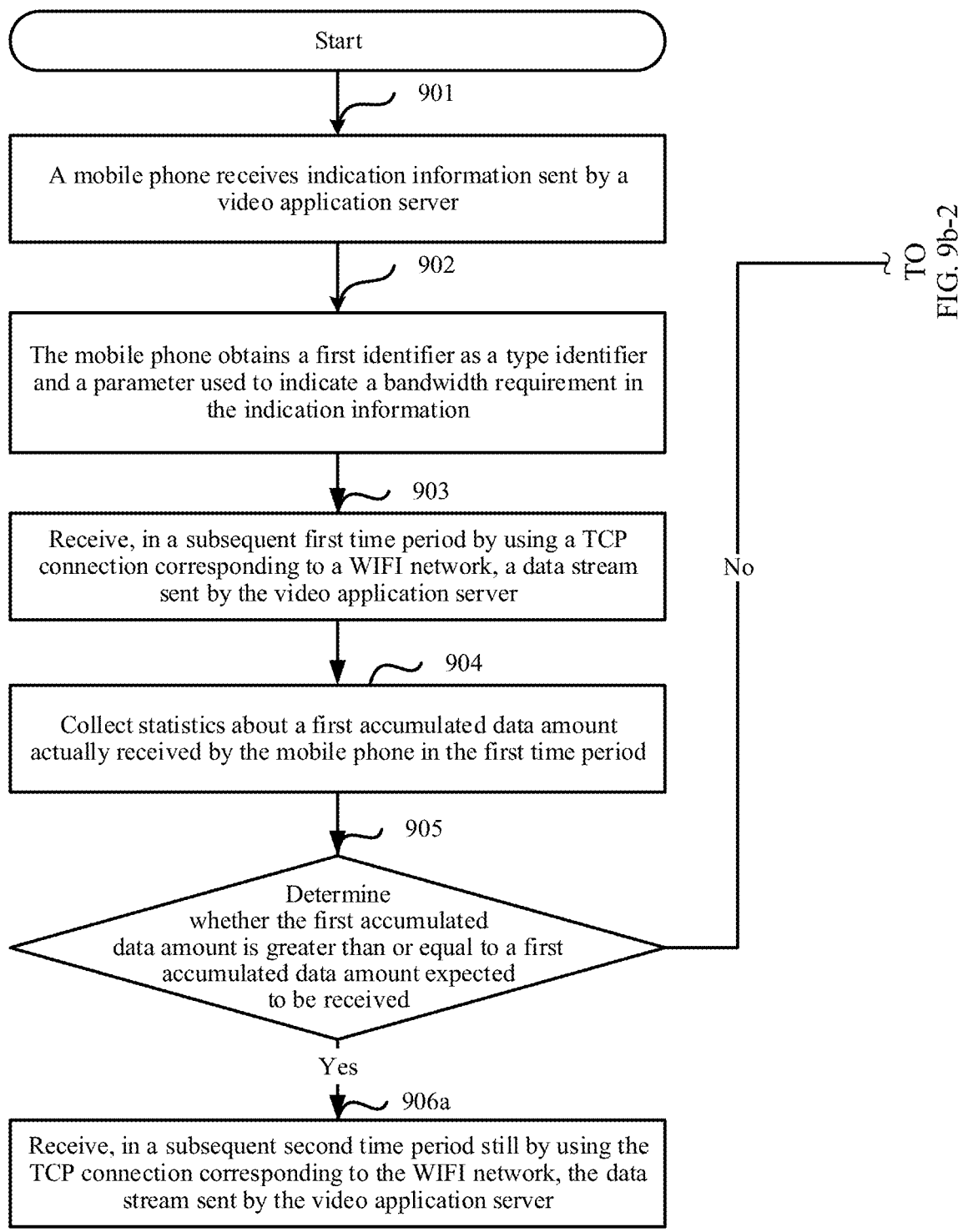
Figures 2, 9B:
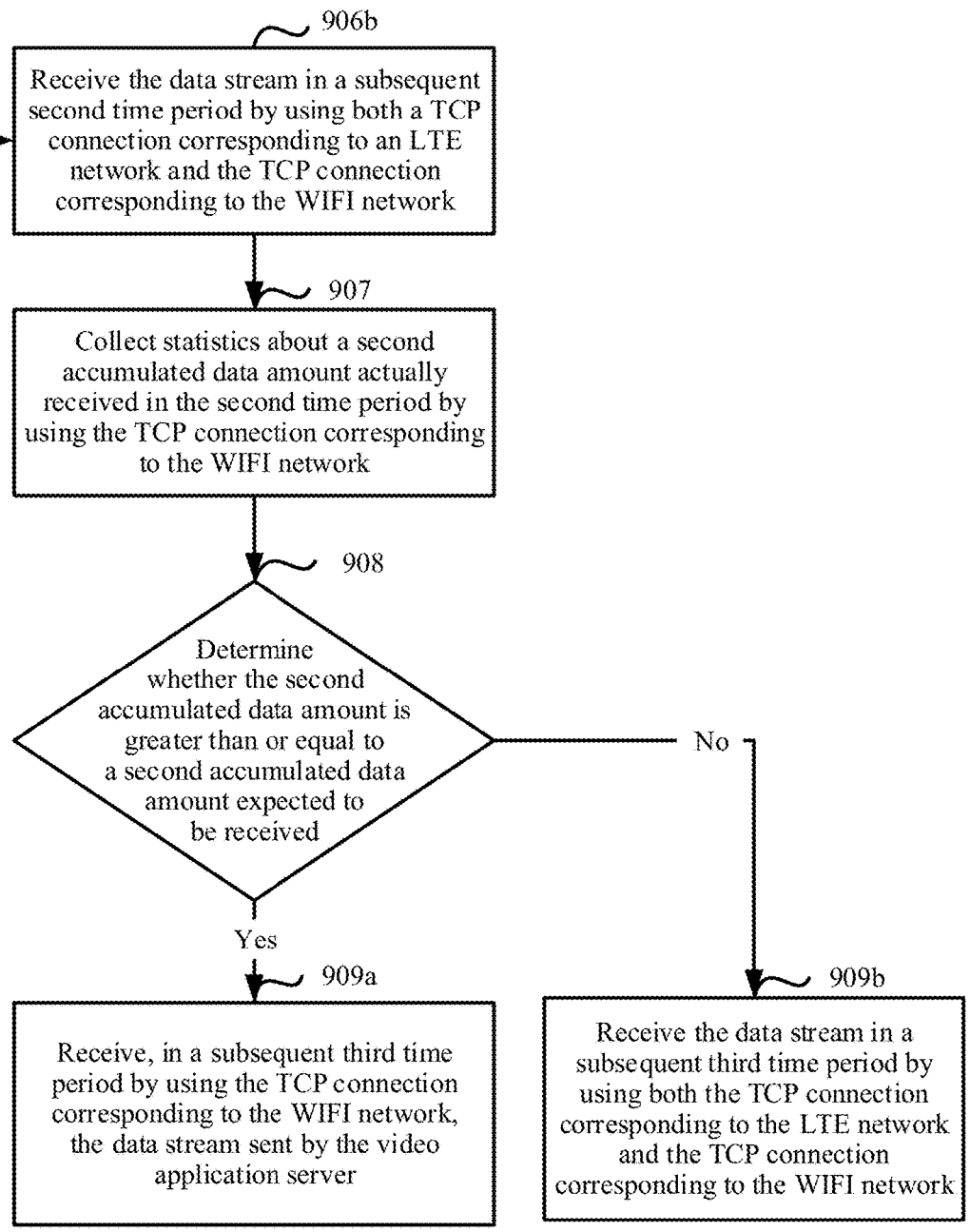

In the following embodiment of this application, a specific procedure of the foregoing data transmission method is further described in detail with reference to a procedure shown in FIG. 9b-1 and FIG. 9b-2. The specific procedure of the method procedure may include the following steps.

Step 901: A mobile phone establishes an MPTCP connection to a video application server, where the MPTCP connection includes a first TCP connection corresponding to an LTE network and a second TCP connection corresponding to a WIFI network.

Step 902: The video application server sends indication information to the mobile phone before sending a data stream by invoking a system interface of the mobile phone, where the indication information includes a first identifier and a parameter used to indicate a bandwidth requirement.

Step 903: The mobile phone receives the data stream from the video application server in a subsequent first time period based on the first identifier by using the second TCP connection corresponding to the WIFI network.

Specifically, after determining that a type identifier is the first identifier, the mobile phone sets a priority of the first TCP connection corresponding to the LTE network to be low. To be specific, the first TCP connection corresponding to the LTE network is established, but is in an idle but unavailable state, and the second TCP connection corresponding to the WIFI network is set to be always in an available state.

Step 904: The mobile phone obtains a first accumulated data amount actually received in the first time period.

For example, the mobile phone obtains, by using an interface function getMPTCPInfo in open-source code, the first accumulated data amount actually received in the first time period by using the second TCP connection.

Step 905: The mobile phone compares the first accumulated data amount with a first accumulated data amount expected to be received, and if the first accumulated data amount is greater than the first accumulated data amount expected to be received, performs step 906a, or if the first accumulated data amount is less than or equal to the first accumulated data amount expected to be received, performs step 906b.

For example, the first accumulated data amount expected to be received is equal to a product of the parameter and duration corresponding to the first time period. For example, if the parameter used to indicate the bandwidth requirement is 4 mbps, and the duration corresponding to the first time period is 3 s, the accumulated data amount expected to be received is 12 mb.

Assuming that a WIFI signal is weak, and the first accumulated data amount is only 3 mb, the first accumulated data amount is less than the first accumulated data amount expected to be received, and step 906b is performed. Assuming that a WIFI signal is strong, and the first accumulated data amount is 20 mb, the first accumulated data amount is greater than the first accumulated data amount expected to be received, and step 906a is performed.

Step 906a: The mobile phone receives the data stream from the video application server in a subsequent second time period still by using the second TCP connection corresponding to the WIFI network.

Step 906b: The mobile phone receives the data stream in a subsequent second time period by using both the first TCP connection corresponding to the LTE network and the second TCP connection corresponding to the WIFI network.

Specifically, the mobile phone adjusts the priority of the first TCP connection corresponding to the LTE network from low to high, that is, the first TCP connection corresponding to the LTE network is in an available state.

Step 907: The mobile phone obtains a second accumulated data amount actually received in the second time period by using the TCP connection corresponding to the WIFI network.

Step 908: The mobile phone compares the second accumulated data amount with a second accumulated data amount expected to be received, and if the second accumulated data amount is greater than the second accumulated data amount expected to be received, performs step 909a, or if the second accumulated data amount is less than or equal to the second accumulated data amount expected to be received, performs step 909b.

For example, the second accumulated data amount expected to be received is equal to a product of the parameter and the second time period. For example, if the parameter is 4 mbps, and the duration corresponding to each of the first time period and the second time period is 3 s, the second accumulated data amount expected to be received is 12 mb. Assuming that the WIFI signal becomes strong in the second time period, and the second accumulated data amount is 24 mb, the second accumulated data amount is greater than the second accumulated data amount expected to be received, and step 909a is performed. Assuming that the WIFI signal is still weak in the second time period, and the second accumulated data amount is 3 mb, the second accumulated data amount is less than the accumulated data amount expected to be received, and step 909b is performed.

Step 909a: The mobile phone receives the data stream from the video application server in a subsequent third time period by using only the second TCP connection corresponding to the WIFI network.

Specifically, the mobile phone adjusts the priority of the first TCP connection corresponding to the LTE network from high to low, that is, the first TCP connection corresponding to the LTE network is in an unavailable state.

Step 909b: The mobile phone receives the data stream in a subsequent third time period still by using both the first TCP connection corresponding to the LTE network and the second TCP connection corresponding to the WIFI network.

It should be noted that, after step 906a, if both accumulated data amounts actually received by the mobile phone in the third time period and even a fourth time period by using the TCP connection corresponding to the WIFI network are still greater than an accumulated data amount expected to be received, the mobile phone increases monitoring duration corresponding to the subsequent time periods, for example, from 3 s to 20 s. Similarly, after step 909b, if both accumulated data amounts actually received by the mobile phone in the third time period and a fourth time period by using the TCP connection corresponding to the WIFI network are still less than an accumulated data amount expected to be received, the mobile phone increases monitoring duration corresponding to the subsequent time periods, for example, from 3 s to 20 s. Therefore, power consumption can be reduced.

Considering that there are various applications in the application market currently, data streams sent by application servers of some applications to an electronic device may carry no indication information. Therefore, the electronic device cannot determine whether the data stream received from the application server is an audio stream or a video stream, and cannot determine a quantity of audio streams or a quantity of video streams. Therefore, according to the another data transmission method provided in this embodiment of this application, the electronic device collects statistics about an accumulated data amount actually received in specified duration, and determines whether a data transmission rate in the duration meets a preset data transmission rate, to further determine a TCP connection to be used to receive a data stream.

In this embodiment of this application, the foregoing data stream transmission method is further described by using an example with reference to the scenario shown in FIG. 7b.

When the mobile phone receives an operation (for example, a tap operation) performed by a user 1 on a play control of a play interface of a video application, the mobile phone sends, to an application server corresponding to the video application, a message for requesting to obtain a multimedia file "Next". After receiving the message, the application server sends a data stream of the multimedia file to the mobile phone by using an MPTCP protocol. The mobile phone receives the data stream according to the foregoing data stream transmission method, and displays an interface shown in FIG. 7b. The data stream received by the mobile phone from the application server may be an audio stream of the multimedia file, or may be a video stream of the multimedia file, or may include an audio stream and a video stream of an advertising service. In addition, the mobile phone cannot determine a quantity of audio streams or a quantity of video streams. Therefore, the mobile phone first attempts to receive the data stream in the first time period by using the first TCP connection corresponding to the cellular network and the second TCP connection corresponding to the WIFI network, and predicts a bandwidth required by a service sent by the application server. Then, the mobile phone receives the data stream in the second time period by using the second TCP connection corresponding to the WIFI network. If the data transmission rate of the second TCP connection meets the predicted bandwidth, the mobile phone may further receive the data stream in a next time period by using the second TCP connection corresponding to the WIFI network. If the data transmission rate of the second TCP connection does not meet the predicted bandwidth, the mobile phone further receives the data stream in a next time period by using the first TCP connection corresponding to the cellular network. In this way, after detecting the operation performed by the user 1, the mobile phone not only can quickly start to play the first frame of the multimedia file "Next", but also can ensure that data traffic of the cellular network is not consumed as much as possible in a time period of caching data.

Figure 10:
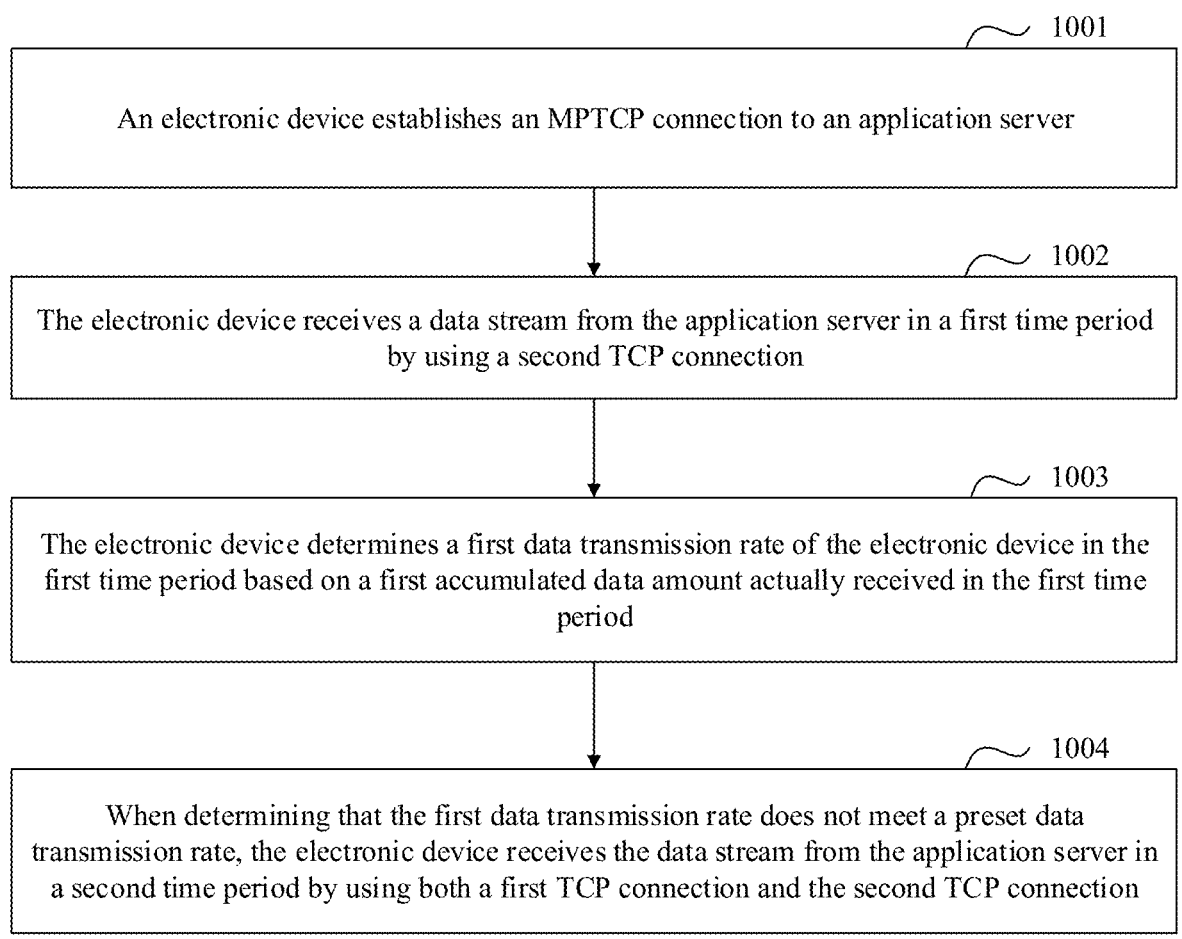
FIG. 10 is a fourth schematic diagram of a data transmission method according to an embodiment of this application.

Specifically, FIG. 10 shows an example of a procedure of another data transmission method according to an embodiment of this application. The method is performed by an electronic device, and the method includes the following steps.

Step 1001: The electronic device first establishes an MPTCP connection to an application server.

The MPTCP connection includes a first TCP connection corresponding to a cellular network and a second TCP connection corresponding to a WIFI network.

Step 1002: The electronic device receives a data stream from the application server in a first time period by using the second TCP connection.

Step 1003: The electronic device determines a first data transmission rate of the electronic device in the first time period based on a first accumulated data amount actually received in the first time period, where the first data transmission rate is equal to a ratio of the first accumulated data amount to duration corresponding to the first time period.

For example, if a WIFI signal in the first time period is not very strong, the duration corresponding to the first time period is 3 seconds, and the first accumulated data amount is 12 mb, the first data transmission rate is 12 mb/3 s, that is, 4 mbps. If a WIFI signal in the first time period is weak, and the first accumulated data amount actually received by the electronic device in the first time period may be 3 mbps, the first data transmission rate is 3 mb/3 s, that is, 1 mbps.

Step 1004: When determining that the first data transmission rate does not meet a preset data transmission rate, the electronic device receives the data stream from the application server in s second time period by using both the first TCP connection and the second TCP connection.

For example, if a WIFI signal in the first time period is weak, and the first data transmission rate is 1 mbps, the electronic device receives the data stream from the application server in the second time period by using both the first TCP connection and the second TCP connection.

It should be noted that the preset data transmission rate may be an empirical value, or may be obtained as follows: The electronic device receives the data stream from the application server in advance before the first time period by using both the first TCP connection and the second TCP connection, predicts, based on an accumulated data amount actually received in the first time period, a data transmission rate required by the application server, and uses the predicted data transmission rate as the preset data transmission rate.

In a possible design, the electronic device determines a second accumulated data amount actually received in the second time period, and determines a second data transmission rate based on the second accumulated data amount actually received in the second time period. If the second data transmission rate meets the preset data transmission rate, the electronic device receives the data stream from the application server in a third time period by using only the second TCP connection.

It should be noted that the first time period, the second time period, and the third time period may have same duration, or may have different duration. The second time period is after the first time period, and the third time period is after the second time period.

For example, the duration corresponding to the first time period is 3 seconds, the duration corresponding to the second time period is also 3 seconds, and the preset data transmission rate is 4 mbps. If the WIFI network changes from a rate-limited state to a rate-unlimited state in the second time period, a data amount actually received by using the TCP connection corresponding to the WIFI network also increases. If the electronic device learns, through calculation, that the second data transmission rate in the second time period is 10 mbps, the electronic device may receive the data stream in the third time period by using only the second TCP connection, and the first TCP connection corresponding to the cellular network is still disabled. In this way, less data traffic of the cellular network can be consumed. In addition, because power consumption of the cellular network is greater than power consumption of the WIFI network, disabling the first TCP connection corresponding to the cellular network when the first TCP connection is not required can reduce power consumption to some extent.

In a possible design, if the electronic device receives the data stream from the application server in M consecutive time periods by using only the second TCP connection, the electronic device learns that an accumulated data amount received after the M time periods is Z1, an accumulated data amount received after M−1 time periods is Z2, and an accumulated data amount received after M−2 time period is Z3. If Z1−Z2 is far greater than or far less than Z2−Z3, it indicates that a data amount received by the electronic device in the $M^{th}$ time period by using the second TCP connection suddenly increases or suddenly decreases. Therefore, the electronic device receives the data stream from the application server in a fourth time period by using both the first TCP connection and the second TCP connection.

For example, if the electronic device is currently playing a video in a video application, and a user switches a video mode from a normal mode to a high-definition mode, a data amount sent by a video application server per unit of time increases. In this case, the accumulated data amount received by the electronic device by using the second TCP connection also increases. Although the accumulated data amount received by the electronic device by using the second TCP connection increases, the accumulated data amount cannot meet an accumulated data amount expected to be received. Therefore, the electronic device receives the data stream from the application server in a next time period by using both the first TCP connection and the second TCP connection.

For another example, if the electronic device currently receives the data stream by using only the second TCP connection, the electronic device learns, through statistics collection at a first moment, that an accumulated data amount actually received by using the second TCP connection is 10 mb, the electronic device learns, through statistics collection at a second moment, that an accumulated data amount actually received by using the second TCP connection is 20 mb, and the electronic device learns, through statistics collection at a third moment, that an accumulated data amount actually received by using the second TCP connection is 23 mb, it indicates that a data amount received by the electronic device in a time period from the second moment to the third moment by using the second TCP connection is very small, and is only 3 mb. In this case, the electronic device may be in the scenario shown in Table 1. Therefore, the electronic device receives the data stream from the application server in the next time period by using both the first TCP connection and the second TCP connection.

In a possible design, when the electronic device learns, through statistics collection in a specified time period for a plurality of times, that the accumulated data amount received by using the second TCP connection is less than the accumulated data amount expected to be received, in subsequent fixed duration (for example, 60 s), statistics collection and determining are not performed on an actually received accumulated data amount, and the electronic device receives the data stream from the application server in the fixed duration by using both the first TCP connection and the second TCP connection. This avoids relatively high power consumption caused when the electronic device repeatedly enables or disables the first TCP connection corresponding to the cellular network because the WIFI signal is unstable.

Figure 11:
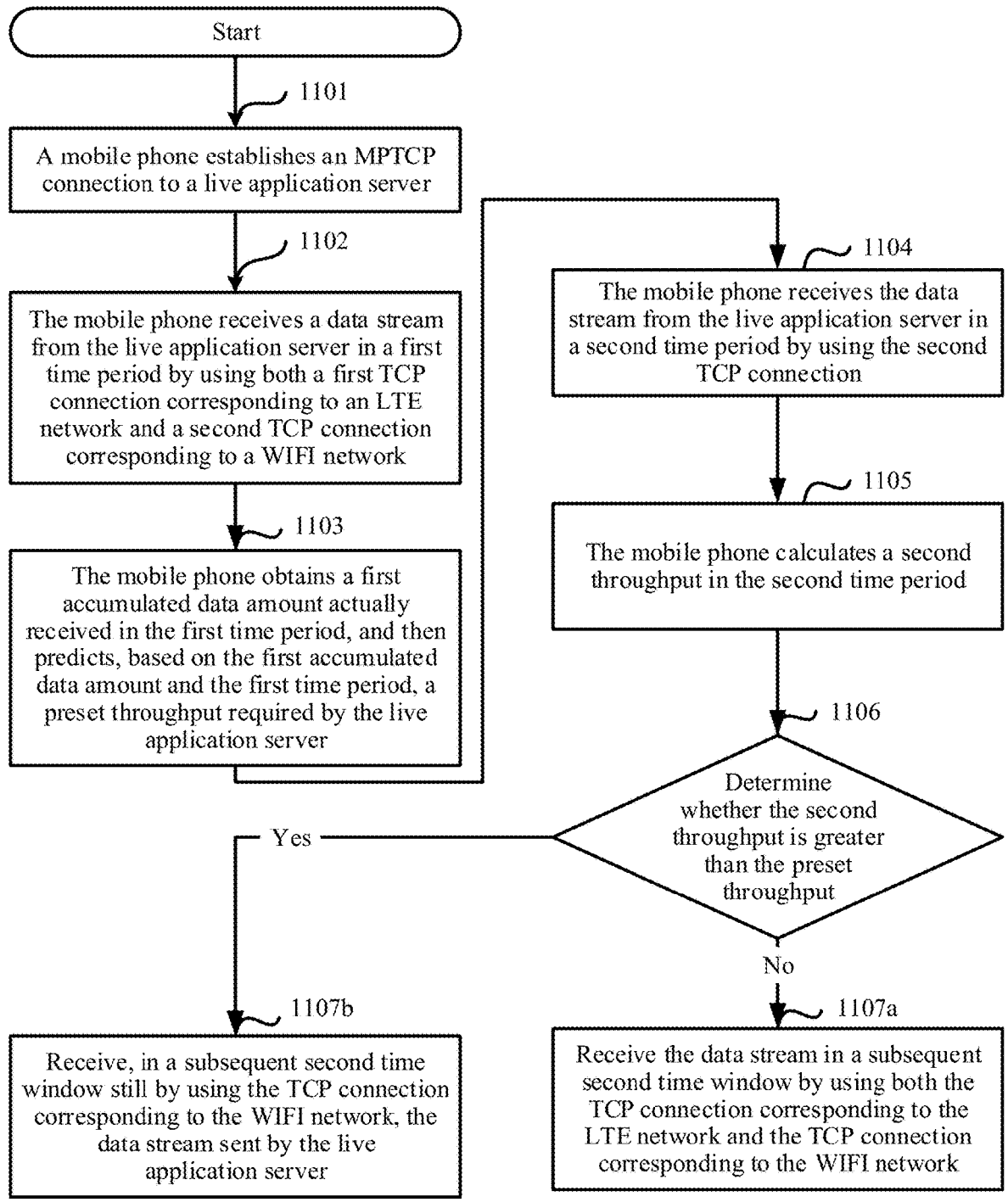
FIG. 11 is a fifth schematic diagram of a data transmission method according to an embodiment of this application.

In the following embodiment of this application, a specific procedure of the foregoing data transmission method is further described in detail with reference to a procedure shown in FIG. 11. The specific procedure of the method may include the following steps.

Step 1101: A mobile phone establishes an MPTCP connection to a live broadcast application server, where the MPTCP connection includes a first TCP connection corresponding to an LTE network and a second TCP connection corresponding to a WIFI network.

Step 1102: Assuming that duration corresponding to each time period is always 3 s, the mobile phone receives a data stream from the live broadcast application server in a first time period by using both the first TCP connection corresponding to the LTE network and the second TCP connection corresponding to the WIFI network.

Step 1103: The mobile phone obtains a first accumulated data amount actually received in the first time period, and then predicts, based on the actually received first accumulated data amount and the first time period, a preset data transmission rate required by the live broadcast application server.

For example, if the first accumulated data amount actually received by the mobile phone in the first 3 s is 12 mb, the preset data transmission rate required by the live broadcast application server is 12 mb/3 s, that is, 4 mbps.

Step 1104: The mobile phone receives the data stream from the live broadcast application server in a second time period by using only the second TCP connection.

Step 1105: The mobile phone obtains a second accumulated data amount actually received in the first time period and the second time period, then calculates a difference between the second accumulated data amount and the first accumulated data amount, and divides the difference by the second time period to obtain a second data transmission rate of the second TCP connection in the second time period.

Still using the foregoing example, the second time period is also 3 s, and the second accumulated data amount is 21 mb/3 s. In this case, the difference between the second accumulated data amount and the first accumulated data amount is 9 mb. Therefore, the difference divided by the second time period is 3 mbps, in other words, the second data transmission rate of the second TCP connection is 3 mbps.

Step 1106: The mobile phone determines whether the second data transmission rate of the second TCP connection is greater than the preset data transmission rate; and if the second data transmission rate of the second TCP connection is greater than the preset data transmission rate, performs step 1107*a*; or if the second data transmission rate of the second TCP connection is less than or equal to the preset data transmission rate, performs step 1107*b*.

Step 1107*a*: The mobile phone continues to receive the data stream from the live broadcast application server in a third time period by using only the second TCP connection.

Step 1107*b*: The mobile phone continues to receive the data stream from the live broadcast application server in a third time period by using both the first TCP connection corresponding to the LTE network and the second TCP connection corresponding to the WIFI network.

It should be noted that, after step 1107*a*, if both data transmission rates of the second TCP connection in the third time period and a fourth time period that are obtained by the mobile phone are still greater than the first data transmission rate, the mobile phone increases a subsequent time period, for example, from 3 s to 20 s. Similarly, after step 1107*b* is performed, if both data transmission rates of the second TCP connection in the third time period and a fourth time period that are obtained by the mobile phone are still less than or equal to the first data transmission rate, the mobile phone increases a subsequent time period, for example, from 3 s to 20 s. This can reduce power consumption to some extent.

In a possible design, the mobile phone may set a counter (an initial value is 0). Each time the mobile phone determines that the data transmission rate of the second TCP connection is greater than the preset data transmission rate, 1 is subtracted from the counter. Each time the mobile phone determines that the data transmission rate of the second TCP connection is less than the preset data transmission rate, 1 is added to the counter. If the counter is greater than or equal to 3, in subsequent fixed duration, statistics collection and determining are not performed on an actually received accumulated data amount, and the electronic device receives the data stream from the application server in the fixed duration by using both the first TCP connection and the second TCP connection.

In conclusion, in this embodiment of this application, the second TCP connection corresponding to the WIFI network may be preferentially used to receive the data stream. If it is found that the data transmission rate does not meet the preset data transmission rate, the two TCP connections are used in time to receive the data stream. The method can still enable less data traffic of a cellular network to be consumed. In addition, when the WIFI network fluctuates, the two TCP connections can be used to receive the data stream in time by monitoring the data transmission rate.

An embodiment of this application further provides a computer-readable storage medium. The computer-readable storage medium includes a computer program, and when the computer program is run on an electronic device, the electronic device is enabled to perform any possible implementation of the foregoing data transmission method.

An embodiment of this application further provides a computer program product. When the computer program product is run on an electronic device, the electronic device is enabled to perform any possible implementation of the foregoing data transmission method.

Figure 12:
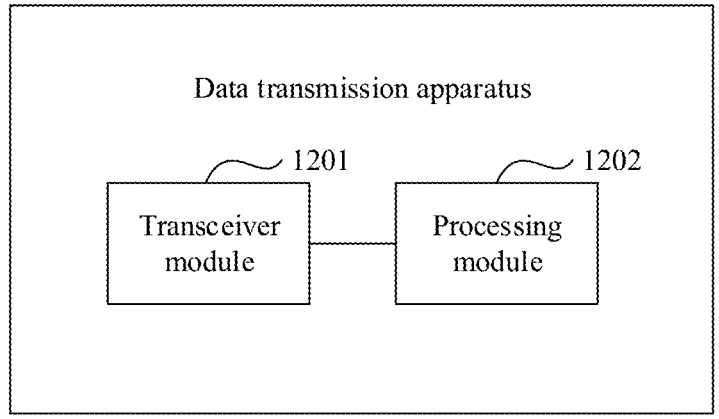
FIG. 12 is a schematic structural diagram of a data transmission apparatus according to an embodiment of this application.

In some embodiments of this application, a data transmission apparatus is disclosed. As shown in FIG. 12, the data transmission apparatus is configured to implement the method described in the first method embodiment, and includes a transceiver module 1201 and a processing module 1202. The transceiver module 1201 is configured to support an electronic device in establishing an MPTCP connection to an application server, and support the electronic device in receiving indication information and a data stream from the application server. The processing module 1202 is configured to support the electronic device in adjusting a receiving policy of each TCP connection, for example, step 803 to step 805 in FIG. 8 and step 903 to step 909*b* in FIG. 9*b*-1 and FIG. 9*b*-2. All related content of the steps in the foregoing method embodiments may be referenced to function descriptions of corresponding function modules, and details are not described herein again.

The data transmission apparatus shown in FIG. 12 is further configured to implement the method described in the second method embodiment, and includes a transceiver module 1201 and a processing module 1202. The transceiver module 1201 is configured to support an electronic device in establishing an MPTCP connection to an application server, and support the electronic device in receiving a data stream from the application server. The processing module 1202 is configured to support the electronic device in adjusting a receiving policy of each TCP connection, for example, step 1002 and step 1003 in FIG. 10 and step 1102 to step 1107*b* in FIG. 11. All related content of the steps in the foregoing method embodiments may be referenced to function descriptions of corresponding function modules, and details are not described herein again.

Figure 13:
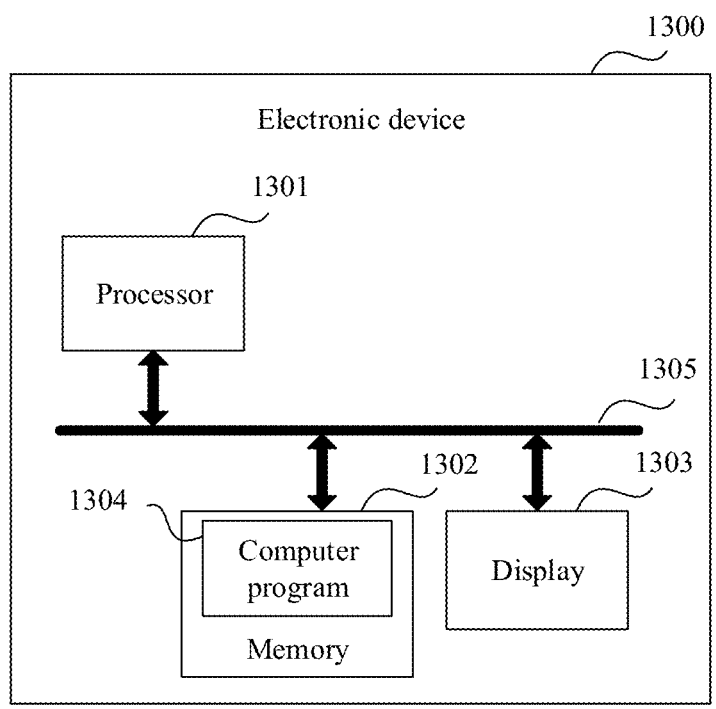
FIG. 13 is a schematic structural diagram of an electronic device according to an embodiment of this application.

In some other embodiments of this application, an electronic device is disclosed. As shown in FIG. 13, the electronic device may include one or more processors 1301, a memory 1302, a display 1303, one or more applications (not shown), and one or more computer programs 1304. The foregoing components may be connected to each other by using one or more communications buses 1305. The one or more computer programs 1304 are stored in the memory 1302 and are executed by the one or more processors 1301. The one or more computer programs 1304 include instructions, and the instructions may be used to perform the steps in FIG. 8 to FIG. 11 and the corresponding embodiments.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

Function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A data transmission method, comprising:
   establishing, by an electronic device, a multipath transmission control protocol (MPTCP) connection to an application server, wherein the MPTCP connection comprises a first transmission control protocol (TCP) connection corresponding to a cellular network and a second TCP connection corresponding to a wireless fidelity (WIFI) network;
   receiving, by the electronic device, indication information from the application server, wherein the indication information comprises a type identifier and a parameter that indicates a bandwidth requirement, and the type identifier indicates a type of a data stream sent by the application server;
   responsive to determining that the type identifier is a first identifier indicating a low data transmission delay requirement, receiving, by the electronic device after receiving the indication information, the data stream from the application server in a first time period by using the second TCP connection; and
   responsive to determining that an accumulated data amount actually received by the electronic device in the first time period does not meet a first accumulated data amount expected to be received, receiving, by the electronic device, the data stream from the application server in a second time period by using both the first TCP connection and the second TCP connection, wherein the first accumulated data amount expected to be received is equal to a product of the parameter and a duration corresponding to the first time period.

2. The method according to claim 1, further comprising:
   responsive to determining that the accumulated data amount received by the electronic device in the first time period meets the first accumulated data amount expected to be received, receiving, by the electronic device, the data stream from the application server in the second time period by using the second TCP connection.

3. The method according to claim 1, further comprising:
   responsive to determining that an accumulated data amount received by the electronic device in the second time period by the second TCP connection meets a second accumulated data amount expected to be received, receiving, by the electronic device, the data stream from the application server in a third time period by using only the second TCP connection, wherein the second accumulated data amount expected to be received is equal to a product of the parameter and the duration corresponding to the second time period.

4. The method according to claim 1, further comprising:
   responsive to determining that the type identifier is a second identifier indicating a high data transmission delay requirement, receiving, by the electronic device after receiving the indication information, the data stream from the application server in the first time period by using both the first TCP connection and the second TCP connection.

5. A data transmission method, comprising:
   establishing, by an electronic device, a multipath transmission control protocol (MPTCP) connection to an application server, wherein the MPTCP connection comprises a first transmission control protocol (TCP) connection corresponding to a cellular network and a second TCP connection corresponding to a wireless fidelity (WIFI) network;
   receiving, by the electronic device, a data stream from the application server in a first time period by using the second TCP connection;
   determining, by the electronic device, a first data transmission rate of the electronic device in the first time period based on a first accumulated data amount received by the electronic device in the first time period, wherein the first data transmission rate is equal to a ratio of the first accumulated data amount to a duration corresponding to the first time period;
   responsive to determining that the first data transmission rate does not meet a preset data transmission rate, receiving, by the electronic device, the data stream from the application server in a second time period by using both the first TCP connection and the second TCP connection;
   determining, by the electronic device, a second data transmission rate of the electronic device in the second time period based on a second accumulated data amount received by the electronic device in the second time period, wherein the second data transmission rate is equal to a ratio of the second accumulated data amount to a duration corresponding to the second time period; and
   responsive to determining that the second data transmission rate in the second time period meets the preset data transmission rate, receiving, by the electronic device, the data stream from the application server in a third time period by using only the second TCP connection.

6. The method according to claim 5, wherein before the receiving, by the electronic device, the data stream from the application server in the first time period by using the second TCP connection, the method further comprises:
   receiving, by the electronic device, the data stream from the application server by using both the first TCP connection and the second TCP connection; and
   determining, by the electronic device, the preset data transmission rate based on data amounts received by using the second TCP connection and the first TCP connection per unit of time.

7. An electronic device, comprising a processor and a memory, wherein:
   the memory is configured to store one or more computer programs; and
   the electronic device, responsive to the processor executing the one or more computer programs stored in the memory, is enabled to perform the following operations:
   establishing a multipath transmission control protocol (MPTCP) connection to an application server, wherein the MPTCP connection comprises a first transmission control protocol (TCP) connection corresponding to a cellular network and a second TCP connection corresponding to a wireless fidelity (WIFI) network;
   receiving indication information from the application server, wherein the indication information comprises a type identifier and a parameter that indicates a data transmission rate requirement, and the type identifier indicates a type of a data stream sent by the application server;

responsive to determining that the type identifier is a first identifier indicating a low data transmission delay requirement, receiving, after receiving the indication information, the data stream from the application server in a first time period by using the second TCP connection; and responsive to determining that an accumulated data amount received by the electronic device in the first time period does not meet a first accumulated data amount expected to be received, receiving the data stream from the application server in a second time period by using both the first TCP connection and the second TCP connection, wherein the first accumulated data amount expected to be received is equal to a product of the parameter and a duration corresponding to the first time period.

8. The electronic device according to claim 7, wherein, responsive to the processor executing the one or more computer programs stored in the memory, the electronic device is further enabled to perform the following operation:

responsive to determining that the accumulated data amount received in the first time period meets the first accumulated data amount expected to be received, receiving the data stream from the application server in the second time period by using the second TCP connection.

9. The electronic device according to claim 7, wherein, responsive to the processor executing the one or more computer programs stored in the memory, the electronic device is further enabled to perform the following operation:

responsive to determining that an accumulated data amount received in the second time period by using the second TCP connection meets a second accumulated data amount expected to be received, receiving the data stream from the application server in a third time period by using only the second TCP connection, wherein the second accumulated data amount expected to be received is equal to a product of the parameter and a duration corresponding to the second time period.

10. The electronic device according to claim 7, wherein, responsive to the processor executing the one or more computer programs stored in the memory, the electronic device is further enabled to perform the following operation:

responsive to determining that the type identifier is a second identifier indicating a high data transmission delay requirement, receiving, after receiving the indication information, the data stream from the application server in the first time period by using both the first TCP connection and the second TCP connection.

* * * * *